(12) United States Patent
Chang et al.

(10) Patent No.: US 7,767,871 B2
(45) Date of Patent: *Aug. 3, 2010

(54) METHOD OF RECOVERING CRYSTALLINE MATERIAL AND COMPOSITIONS THEREFROM

(75) Inventors: Yun-feng Chang, Houston, TX (US); Daria N. Lissy, Glen Mills, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 994 days.

This patent is subject to a terminal disclaimer.

(21) Appl. No.: 11/315,469

(22) Filed: Dec. 22, 2005

(65) Prior Publication Data

US 2007/0149836 A1    Jun. 28, 2007

(51) Int. Cl.
C07C 1/00 (2006.01)
B01J 27/182 (2006.01)

(52) U.S. Cl. .................. 585/640; 585/639; 502/64; 502/214

(58) Field of Classification Search .................. 585/639, 585/640; 502/64, 71, 214, 232, 240
See application file for complete search history.

(56) References Cited

U.S. PATENT DOCUMENTS

| | | | |
|---|---|---|---|
| 4,062,905 A | 12/1977 | Chang et al. | |
| 4,079,095 A | 3/1978 | Givens et al. | |
| 4,310,440 A | 1/1982 | Wilson et al. | |
| 4,440,871 A | 4/1984 | Lok et al. | |
| 5,367,100 A | 11/1994 | Gongwei et al. | |
| 6,503,863 B2 | 1/2003 | Fung et al. | |
| 6,541,415 B2 | 4/2003 | Vaughn et al. | |
| 6,660,682 B2 | 12/2003 | Cao et al. | |
| 6,787,501 B2 | 9/2004 | Vaughn et al. | |
| 7,122,500 B2 * | 10/2006 | Chang et al. | 502/214 |
| 7,253,331 B2 * | 8/2007 | Martens et al. | 585/640 |
| 7,449,611 B2 | 11/2008 | Chang et al. | |
| 7,453,020 B2 | 11/2008 | Chang et al. | |
| 7,456,330 B2 | 11/2008 | Chang | |
| 2003/0181322 A1 | 9/2003 | Chang et al. | |
| 2005/0256354 A1 | 11/2005 | Martens et al. | |

FOREIGN PATENT DOCUMENTS

WO    WO 03/000412    1/2003
WO    WO 03/000413    1/2003
WO    WO 2005/113145    12/2005

OTHER PUBLICATIONS

Bohmer, M.R., et al.; "*Weak Polyelectrolytes between Two Surfaces: Adsorption and Stabilization*," Macromolecules, vol. 23, pp. 2288-2301 (1990).
Muhle, K.; "*Floc Stability in Laminar and Turbulent Flow*," Coagulation and Flocculation: Theory and Applications, Marcel Dekker, Inc., pp. 355-388 (1993).
Pelssers, E.G.M., et al.; "*Kinetic Aspects of Polymer Bridging: Equilibrium Flocculation and Nonequilibrium Flocculation*," Colloids and Surfaces, vol. 38, pp. 15-25 (1989).
Gregory, J.; "*Polymer Adsorption and Flocculation in Sheared Suspensions*," Colloids and Surfaces, vol. 31, pp. 231-253 (1988).
Moudgil, B.M., et al.; "*Collision Efficiency Factors in Polymer Flocculation of Fine Parties*," Journal of Colloid and Interface Science, vol. 119, No. 2, pp. 466-473 (1987).
Mühle, K., et al.; *Letters to the Editors— Wissenschaftliche Kurzherichte*, Colloid & Polymer Science, vol. 258, pp. 1391-1392 (1980).
Domasch, K. et al.; "*Zur Physikalisch Begrundeten Modellierung Des Flockungsprozesses*," Chem. Techn., vol. 34, pp. 360-363 (1982).
Mühle K.; "*The Effect of Mechanical Forces on Adhesive Strength in Bridging Flocculation*," Colloids and Surfaces, vol. 22, pp. 249-269 (1987).
Gregory, J.; "*Fundamentals of Flocculation*," Critical Reviews in Environmental Control, CRC Press, vol. 19, Issue 3, pp. 185-230 (1989).
Bottero, J.Y., et al.; "*Adsorption of Nonionic Polyacrylamide on Sodium Montmorillonite: Relation between Adsorption, Potential, Turbidity, Enthalpy of Adsorption Data and C-NMR in Aqueous Solution*," Journal of Colloid and Interface Science, vol. 124, No. 2, pp. 515-527 (1988).
Nabzar, L., et al.; "*An Experimental Study of Kaolinite Crystal Edge-Polyacrylamide Interactions in Dilute Suspensions*," Journal of Colloid and Interface Science, vol. 108, No. 1, pp. 243-248 (1985).
Lagaly, G.; "*Peptization (Deflocculation) of Clays by Macromolecules*," Coagulation and Flocculation: Theory and Applications, Marcel Dekker, Inc., pp. 487-490 (1993).

* cited by examiner

*Primary Examiner*—In Suk Bullock
(74) *Attorney, Agent, or Firm*—Kevin M. Faulkner; David M. Weisberg; Diane Kilpatrick-Lee

(57) ABSTRACT

A method for recovering molecular sieve crystals from a synthesis mixture that comprises adding at least one flocculant having a certain molecular weight and a certain charge density that contribute to the acceleration of the settling rate of the molecular sieve crystals and compositions made from the method.

14 Claims, No Drawings

US 7,767,871 B2

METHOD OF RECOVERING CRYSTALLINE MATERIAL AND COMPOSITIONS THEREFROM

FIELD OF THE INVENTION

The present invention relates to a method of recovering crystalline materials. More particularly, the invention relates to a method of recovering crystalline materials by flocculation, and the compositions therefrom.

BACKGROUND OF THE INVENTION

Olefins are traditionally produced from petroleum feedstock by catalytic or steam cracking processes. These cracking processes, especially steam cracking, produce light olefin(s) such as ethylene and/or propylene from a variety of hydrocarbon feedstock. Ethylene and propylene are important commodity petrochemicals useful in a variety of processes for making plastics and other chemical compounds.

The petrochemical industry has known that oxygenates, especially alcohols, are convertible into light olefin(s). There are numerous technologies available for producing oxygenates including fermentation or reaction of synthesis gas derived from natural gas, petroleum liquids, carbonaceous materials including coal, recycled plastics, municipal waste or any other organic material. Generally, the production of synthesis gas involves a combustion reaction of natural gas, mostly methane, and an oxygen source into hydrogen, carbon monoxide and/or carbon dioxide. Syngas production processes are well known, and include conventional steam reforming, autothermal reforming or a combination thereof.

Methanol, the preferred alcohol for light olefin production, is typically synthesized from the catalytic reaction of hydrogen, carbon monoxide and/or carbon dioxide in a reactor in the presence of a heterogeneous catalyst. For example, in one synthesis process methanol is produced using a copper/zinc oxide catalyst in a water-cooled tubular reactor. The preferred methanol conversion process is generally referred to as a methanol-to-olefin(s) process (MTO), where an oxygenate, typically mostly methanol, is converted into primarily ethylene and/or propylene in the presence of a molecular sieve.

There are many different types of molecular sieves well known to convert a feedstock, especially an oxygenate containing feedstock, into one or more olefin(s). Molecular sieves, such as zeolites or zeolite-type molecular sieves, carbons and oxides, are porous solids having pores of different sizes that selectively adsorb molecules that can enter the pores, and exclude other molecules that are too large. Examples of molecular sieves useful in converting an oxygenate into olefin(s) are: U.S. Pat. No. 5,367,100 describes the use of a well known zeolite, ZSM-5, to convert methanol into olefin(s); U.S. Pat. No. 4,062,905 discusses the conversion of methanol and other oxygenates to ethylene and propylene using crystalline aluminosilicate zeolites, for example Zeolite T, ZK5, erionite and chabazite; U.S. Pat. No. 4,079,095 describes the use of ZSM-34 to convert methanol to hydrocarbon products such as ethylene and propylene; U.S. Pat. No. 4,310,440 describes producing light olefin(s) from an alcohol using a crystalline aluminophosphates, often represented by $ALPO_4$; and U.S. Pat. No. 4,440,871 describes silicoaluminophosphate molecular sieves (SAPO), one of the most useful molecular sieves for converting methanol into olefin(s).

Typically, molecular sieves are formed into molecular sieve catalyst compositions to improve their durability in commercial conversion processes. The collisions within a commercial process between catalyst composition particles themselves, the reactor walls, and other reactor systems cause the particles to breakdown into smaller particles called fines. The physical breakdown of the molecular sieve catalyst composition particles is known as attrition. Problems develop in the recovery systems because fines often exit the reactor in the product containing effluent stream. Catalyst compositions having a higher resistance to attrition generate fewer fines; this results in improved process operability, and less catalyst composition being required for a conversion process, and therefore, lower overall operating costs.

It is known that the way in which the molecular sieve catalyst compositions are made or formulated affects catalyst composition attrition. Molecular sieve catalyst compositions are formed by combining a molecular sieve and a matrix material usually in the presence of a binder. For example, PCT Patent Publication WO 03/000413 A1 published Jan. 3, 2003 discloses a low attrition molecular sieve catalyst composition using a synthesized molecular sieve that has not been fully dried, or partially dried, in combination in a slurry with a binder and/or a matrix material. Also, PCT Patent Publication WO 03/000412 A1 published Jan. 3, 2003 discusses a low attrition molecular sieve catalyst composition produced by controlling the pH of the slurry away from the isoelectric point of the molecular sieve. U.S. Pat. No. 6,787,501 shows making a low attrition molecular sieve catalyst composition by making a slurry of a synthesized molecular sieve, a binder, and optionally a matrix material, wherein 90 percent by volume of the slurry contains particles having a diameter less than 20 µm. U.S. Patent Application Publication No. U.S. 2003/0181322 published Sep. 25, 2003, which is herein fully incorporated by reference, illustrates making an attrition resistant molecular sieve catalyst composition by controlling the ratio of a binder to a molecular sieve. U.S. Pat. No. 6,503,863 is directed to a method of heat treating a molecular sieve catalyst composition to remove a portion of the template used in the synthesis of the molecular sieve. U.S. Pat. No. 6,541,415 describes improving the attrition resistance of a molecular sieve catalyst composition that contains molecular sieve-containing recycled attrition particles and virgin molecular sieve. U.S. Pat. No. 6,660,682 describes the use of a polymeric base to reduce the amount of templating agent required to produce a particular molecular sieve.

It is also known that in typical commercial processes that flocculants are used in the recovery of synthesized molecular sieves. These flocculants are known to facilitate the crystal recovery and to increase the yield of recovery of the synthesized molecular sieve typically in a large scale commercial process. However, the presence of a flocculant can affect the catalyst formulation, and in some cases flocculation can result in the formulation of catalyst compositions having lower attrition resistance, lower selectivity in various conversion processes, and high slurry viscosity. See, for example, U.S. Patent Publication No. 2005-0256354, published Nov. 17, 2005, claiming a process for producing one or more olefin(s), comprising the steps of (a) introducing a feedstock to a reactor system in the presence of a molecular sieve catalyst composition comprising a synthesized molecular sieve having been recovered in the presence of a flocculant; (b) withdrawing from the reactor system an effluent stream; and (c) passing the effluent gas through a recovery system recovering at least the one or more olefin(s). See also, U.S. patent application Ser. No. 11/109,397, filed Apr. 19, 2005, which claims a catalyst composition comprising a non-over flocculated molecular sieve and an over flocculated molecular sieve. See also, U.S. patent application Ser. No. 11/109,584, filed Apr. 19, 2005, which claims a catalyst composition comprising an over flocculated molecular sieve and a phosphorous compound. See also, U.S. patent application Ser. No. 11/109,586, filed Apr. 19, 2005, which claims a catalyst composition prepared by the process comprising (a) combining: (i) an over flocculated molecular sieve; (ii) a binder; and (iii) optionally, a matrix material to form a catalyst slurry; and (b) milling the catalyst slurry.

Although these molecular sieve catalyst compositions described above are useful in hydrocarbon conversion processes, it would be desirable to have an improved molecular sieve catalyst composition having better attrition performance and lower slurry viscosity.

SUMMARY OF THE INVENTION

In one embodiment, the invention comprises a recovered molecular sieve comprising a flocculant having a molecular weight from about 500 to about 50,000,000 and a charge density of from about 5% to about 100%. In another embodiment, the flocculant comprises more than 20% charge density. The flocculant may be cationic, anionic, nonionic, or mixtures thereof. In another embodiment, the recovered molecular sieve comprises greater than or equal to about 0.005 wt % flocculant based on the total weight of said recovered molecular sieve In another embodiment, the invention comprises a recovered molecular sieve comprising a first flocculant and a second flocculant, wherein said first flocculant has a molecular weight of from about 500 to about 500,000 and a charge density of from about 5% to about 100% and said second flocculant has a molecular weight of from about 50,000 to about 50,000,000 and a charge density of from about 0% to about 20%, and wherein said second flocculant has a molecular weight greater than said first flocculant and has a charge density less than said first flocculant. The first flocculant and the second flocculant may also be cationic, anionic, nonionic, or mixtures thereof. In another embodiment, the recovered molecular sieve comprises greater than or equal to about 0.005 wt % first flocculant based on the total weight of said recovered molecular sieve. In another embodiment, the recovered molecular sieve comprises greater than or equal to about 0.005 wt % second flocculant based on the total weight of said recovered molecular sieve. In another embodiment the ratio of said first flocculant to said second flocculant in the recovered molecular sieve is from 100:1 to 1:100 or from 50:1 to 1:50.

In one embodiment, the present invention comprises a method of recovering molecular sieve crystals comprising adding a flocculant to a molecular sieve synthesis mixture, wherein said flocculant has a molecular weight from about 500 to about 50,000,000 and a charge density of from about 5% to about 100%. In another embodiment, the method further comprises filtrating the flocculated molecular sieve synthesis mixture. In another embodiment, the rate of settling of said molecular sieve crystals is from about 1.2 vol. %/hr to about 125 vol. %/hr, or about 1.25 vol. %/hr to about 120 vol. %/hr, or from about 5 vol. %/hr to about 100 vol. %/hr, or from about 8 vol. %/hr to about 90 vol. %/hr, or from about 10 vol. %/hr to about 70 vol. %/hr, or from about 14 vol. %/hr to about 50 vol. %/hr, or from about 20 vol. %/hr to about 30 vol. %/hr.

In another embodiment, the present invention comprises a method of recovering molecular sieve crystals comprising: adding a first flocculant to a molecular sieve synthesis mixture, wherein said first flocculant has a molecular weight of from about 500 to about 1,000,000 and a. charge density of from about 5% to about 100%; agitating said molecular sieve synthesis mixture; and adding a second flocculant to said molecular sieve synthesis mixture, wherein said second flocculent has a molecular weight of from about 50,000 to about 50,000,000 and a charge density of from about 0% to about 20%, and wherein said second flocculant has a molecular weight greater than said first flocculant and has a charge density less than said first flocculant. In another embodiment, the method further comprises filtrating the molecular sieve synthesis mixture. In another embodiment, the rate of settling of said molecular sieve crystals is from about 1.2 vol. %/hr to about 125 vol. %/hr, or about 1.25 vol. %/hr to about 120 vol. %/ hr, or from about 5 vol. %/hr to about 100 vol. %/hr, or from about 8 vol. %/hr to about 90 vol. %/hr, or from about 10 vol. %/ hr to about 70 vol. %/hr, or from about 14 vol. %/hr to about 50 vol. %/hr, or from about 20 vol. %/hr to about 30 vol. %/ hr.

Any two or more of the above embodiments can be combined to describe additional embodiments of the invention of this patent application.

DETAILED DESCRIPTION OF THE INVENTION

Introduction

The invention is directed toward a method of recovering a crystalline product using non-mechanical means, resulting in a processable product slurry and a catalyst with good attrition resistance. A molecular sieve catalyst product is typically formed from the combination of a molecular sieve, a binder, and optionally, most preferably, a matrix material. In order to recover this molecular sieve crystalline product, either gravitational means or mechanical means are used. It has been discovered that the presence of an amount of flocculant, allows for quick and easy recovery. An excess amount of flocculant will result in poor processability of the resulting molecular sieve crystalline slurry and filtration problems. Further, it has been discovered that by reducing particle surface charge density of the crystalline material, faster settling rates can be achieved. Therefore, it has been discovered that by using the described method, disclosed herein, a processable molecular sieve crystalline slurry and a catalyst composition with good attrition resistance result.

For purposes of this specification and the appended claims, "recovered molecular sieve" or "flocculated molecular sieve" is the sieve obtained after flocculation and comprises at least one flocculant.

Molecular Sieves

Molecular sieves have various chemical, physical, and framework characteristics. Molecular sieves have been well classified by the Structure Commission of the International Zeolite Association (IZA) according to the rules of the IUPAC Commission on Zeolite Nomenclature. A framework-type describes the connectivity, topology, of the tetrahedrally coordinated atoms constituting the framework, and making an abstraction of the specific properties for those materials. Framework-type zeolite and zeolite-type molecular sieves for which a structure has been established, are assigned a three letter code and are described in the *Atlas of Zeolite Framework Types,* 5th edition, Elsevier, London, England (2001), which is herein fully incorporated by reference. For additional information on molecular sieve types, structures and characteristics, see van Bekkum, et al., *Introduction to Zeolite Science and Practice, Second Completely Revised and Expanded Edition*, Volume 137, Elsevier Science, B.V., Amsterdam, Netherlands (2001), which is also fully incorporated herein by reference.

Non-limiting examples of these molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof, the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW and SOD. Non-limiting examples of the preferred molecular sieves, particularly for converting an oxygenate containing feedstock into olefin(s), include AEI, AEL, AFY, BEA, CHA, EDI, FAU, FER, GIS, LTA, LTL, MER, MFI, MOR, MTT, MWW, TAM and TON. In one preferred embodiment, the molecular sieve of the invention has an AEI topology or a CHA topology, or a combination thereof, most preferably an intergrowth thereof.

The small, medium and large pore molecular sieves have from a 4-ring to a 12-ring or greater framework-type. In a preferred embodiment, the molecular sieves have 8-, 10- or 12-ring structures or larger and an average pore size in the range of about 3 Å to 15 Å. In the most preferred embodiment, the molecular sieves, preferably SAPO molecular sieves, have 8-rings and an average pore size less than about 5 Å, preferably in the range of from 3 Å to about 5 Å, more preferably from 3 Å to about 4.5 Å, and most preferably from 3.5 Å to about 4.2 Å.

Molecular sieves based on silicon, aluminum, and phosphorous, and metal containing molecular sieves thereof, have been described in detail in numerous publications including for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683, 217, 4,744,885 (FeAPSO), EP-A-0 158 975 and U.S. Pat. No. 4,935,216 (ZnAPSO, EP-A-0 161 489 (CoAPSO), EP-A-0 158 976 (ELAPO, where EL is Co, Fe, Mg, Mn, Ti or Zn), U.S. Pat. No. 4,310,440 (AlPO$_4$), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758, 419, 4,882,038, 5,434,326 and 5,478,787 (MgAPSO), U.S. Pat. No. 4,554,143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500,651, 4,551,236 and 4,605, 492 (TiAPO), U.S. Pat. No. 4,824,554, 4,744,970 (CoAPSO), U.S. Pat. No. 4,735,806 (GaAPSO), EP-A-0 293 937 (QAPSO, where Q is framework oxide unit [QO2]), as well as U.S. Pat. Nos. 4,567,029, 4,686,093, 4,781,814, 4,793,984, 4,801,364, 4,853,197, 4,917,876, 4,952,384, 4,956,164, 4,956,165, 4,973,785, 5,098,684 (MCM-41), U.S. Pat. No. 5,198,203 (MCM-48), U.S. Pat. No. 5,241,093, 5,304,363 (MCM-50), U.S. Pat. No. 5,493,066, 5,675,050, 6,077,498 (ITQ-1), U.S. Pat. No. 6,409,986 (ITQ-5), U.S. Pat. No. 6,419,895 (UZM-4), U.S. Pat. No. 6,471,939 (ITQ-12), U.S. Pat. No. 6,471,941 (ITQ-13), U.S. Pat. No. 6,475,463 (SSZ-55), U.S. Pat. No. 6,500,404 (ITQ-3), U.S. Pat. No. 6,500,998 (UZM-5 and UZM-6), U.S. Pat. No. 6,524,551 (MCM-58) and U.S. Pat. No. 6,544,495 (SSZ-57), U.S. Pat. No. 6,547, 958 (SSZ-59), U.S. Pat. No. 6,555,090 (ITQ-36) and U.S. Pat. No. 6,569,401 (SSZ-64), all of which are herein fully incorporated by reference. Other molecular sieves are described in R. Szostak, *Handbook of Molecular Sieves*, Van Nostrand Reinhold, New York, N.Y. (1992), which is herein fully incorporated by reference.

The more preferred silicon, aluminum and/or phosphorous containing molecular sieves, and aluminum, phosphorous., and optionally silicon, containing molecular sieves include aluminophosphate (ALPO) molecular sieves and silicoaluminophosphate (SAPO) molecular sieves and substituted, preferably metal substituted, ALPO and SAPO molecular sieves. The most preferred molecular sieves are SAPO molecular sieves, and metal substituted SAPO molecular sieves.

In one embodiment, the molecular sieve, as described in many of the U.S. Patents mentioned above, is represented by the empirical formula, on an anhydrous basis:

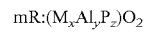

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably from 0 to 0.5, and most preferably from 0 to 0.3; x, y, and z represent the mole fraction of Al, P and M as tetrahedral oxides, where M is a metal selected from one of Group IA, IIA, IB, IIIB, IVB, VB, VIB, VIIB, VIIIB and Lanthanide's of the Periodic Table of Elements, preferably M is selected from one of the group consisting of Co, Cr, Cu, Fe, Ga, Ge, Mg, Mn, Ni, Si, Ti, Zn and Zr. In an embodiment, m is greater than or equal to 0.2, and x, y and z are greater than or equal to 0.01. In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Synthesis of a molecular sieve, especially a SAPO molecular sieve, its formulation into a SAPO catalyst, and its use in converting a hydrocarbon feedstock into olefin(s), is shown in, for example, U.S. Pat. Nos. 4,499,327, 4,677,242, 4,677, 243, 4,873,390, 5,095,163, 5,714,662 and 6,166,282, all of which are herein fully incorporated by reference. Non-limiting examples of SAPO and ALPO molecular sieves of the invention include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44 (U.S. Pat. No. 6,162,415), SAPO-47, SAPO-56, ALPO-5, ALPO-11, ALPO-18, ALPO-31, ALPO-34, ALPO-36, ALPO-37, ALPO-46, and metal containing molecular sieves thereof. The more preferred molecular sieves include one or a combination of SAPO-18, SAPO-34, SAPO-35, SAPO-44, SAPO-56, ALPO- 18 and ALPO-34, even more preferably one or a combination of SAPO-18, SAPO-34, ALPO-34 and ALPO-18, and metal containing molecular sieves thereof, and most preferably one or a combination of SAPO-34 and ALPO-18, and metal containing molecular sieves thereof.

In an embodiment, the molecular sieve is an intergrowth material having two or more distinct phases of crystalline structures within one molecular sieve composition. In particular, SAPO intergrowth molecular sieves are described in the U.S. Pat. No. 6,812,372, PCT Publication WO 02/070407 published Sep. 12, 2002 and PCT Publication WO 98/15496 published Apr. 16, 1998, which are herein fully incorporated by reference. For example, SAPO-18, ALPO-18 and RUW-18 have an AEI framework-type, and SAPO-34 has a CHA framework-type. In another embodiment, the molecular sieve comprises at least one intergrown phase of AEI and CHA framework-types, preferably the molecular sieve has a greater amount of CHA framework-type to AEI framework-type, and more preferably the molar ratio of CHA to AEI is greater than 1:1.

Molecular Sieve Synthesis

Generally, molecular sieves are synthesized by the hydrothermal crystallization of one or more of a source of aluminum, a source of phosphorous, a source of silicon, a templating agent, and a metal containing compound. Typically, a combination of sources of silicon, aluminum and phosphorous, optionally with one or more templating agents and/or one or more metal containing compounds, are placed in a sealed pressure vessel, optionally lined with an inert plastic such as polytetrafluoroethylene, and heated, under a crystallization pressure and temperature, at static or stirred conditions, until a crystalline material is formed in a synthesis mixture. Then, in a commercial process in-particular, one or more flocculant(s) is added to the synthesis mixture to speed up settling of the crystals and to achieve phase separation, i.e., a solids-rich phase in the lower portion of the vessel and a solids-free or solids-lean liquid layer in the upper portion of the vessel. A portion of the upper liquid layer is removed, decanted, or reduced in quantity. The remaining flocculated product containing the crystalline molecular sieve is then, optionally, contacted with the same or a different fresh liquid, typically with water, in a washing step, from once to many times depending on the desired purity of the supernatant, liquid portion, of the synthesis mixture being removed. It is also optional to repeat this process by adding in additional flocculant followed by additional washing steps. Then, the crystallized molecular sieve is recovered by filtration, centrifugation and/or decanting. Preferably, the molecular sieve is filtered using a filter that provides for separating certain crystal sized molecular sieve particles from any remaining liquid portion that may contain different size molecular sieve crystals.

After crystallization, the slurry in the crystalliser has two main components: the formed crystals and the remainders, or debris, from the non reacted raw chemicals. The latter part is called mother liquor. In further processing of the slurry, crystals and mother liquor are separated via conventional methods such as, but not limited to, filtration or centrifugation. Because the mother liquor still contains reactive components, it can be recycled and re-used in a subsequent crystallization or synthesis, thereby improving efficiency of and reducing the overall cost of catalyst manufacturing. The mother liquor recycle may also still be applied even when the separation of the mother liquor and crystals is done using a flocculant.

In a preferred embodiment the molecular sieves are synthesized by forming a reaction product or synthesis mixture of a source of silicon, a source of aluminum, a source of phosphorous and an organic templating agent, preferably a nitrogen containing organic templating agent. This particularly preferred embodiment results in the synthesis of a silicoaluminophosphate crystalline material in a synthesis mixture. One or more flocculants are added to the silicoaluminophosphate crystalline material, and the crystallized molecular sieve is then removed or isolated by filtration, centrifugation and/or decanting.

Non-limiting examples of silicon sources include a silicates, fumed silica, for example, Aerosil-200 available from Degussa Inc., New York, N.Y., and CAB-O-SIL M-5, silicon compounds such as tetraalkyl orthosilicates, for example, tetramethyl orthosilicate (TMOS) and tetraethylorthosilicate (TEOS), colloidal silicas or aqueous suspensions thereof, for example Ludox-HS-40 sol available from E.I. du Pont de Nemours, Wilmington, Del., silicic acid, alkali-metal silicate, or any combination thereof. The preferred source of silicon is a silica sol.

Non-limiting examples of aluminum sources include aluminum-containing compositions such as aluminum alkoxides, for example aluminum isopropoxide, aluminum phosphate, aluminum hydroxide, sodium aluminate, pseudo-boehmite, gibbsite and aluminum trichloride, or any combinations thereof. A preferred source of aluminum is pseudo-boehmite, particularly when producing a silicoaluminophosphate molecular sieve.

Non-limiting examples of phosphorous sources, which may also include aluminum-containing phosphorous compositions, include phosphorous-containing, inorganic or organic, compositions such as phosphoric acid, organic phosphates such as triethyl phosphate, and crystalline or amorphous aluminophosphates such as $AlPO_4$, phosphorous salts, or combinations thereof. The preferred source of phosphorous is phosphoric acid, particularly when producing a silicoaluminophosphate.

Templating agents are generally compounds that contain elements of Group VA of the Periodic Table of Elements, particularly nitrogen, phosphorus, arsenic and antimony, more preferably nitrogen or phosphorous, and most preferably nitrogen. Typical templating agents of Group VA of the Periodic Table of elements also contain at least one alkyl or aryl group, preferably an alkyl or aryl group having from 1 to 10 carbon atoms, and more preferably from 1 to 8 carbon atoms. The preferred templating agents are nitrogen-containing compounds such as amines and quaternary ammonium compounds.

The quaternary ammonium compounds, in one embodiment, are represented by the general formula $R_4N^+$, where each R is hydrogen or a hydrocarbyl or substituted hydrocarbyl group, preferably an alkyl group or an aryl group having from 1 to 10 carbon atoms. In one embodiment, the templating agents include a combination of one or more quaternary ammonium compound(s) and one or more of a mono-, di- or tri-amine.

Non-limiting examples of templating agents include tetraalkyl ammonium compounds including salts thereof such as tetramethyl ammonium compounds including salts thereof. The preferred templating agent or template is a tetraethylammonium compound, tetraethyl ammonium hydroxide (TEAOH) and salts thereof, particularly when producing a SAPO molecular sieve.

Flocculants

There are many types of flocculants, including, but not limited to, inorganic and organic flocculants. Inorganic flocculants are typically salts of multi-valent metal cations that hydrolyze to form insoluble hydroxide precipitates in water. Non-limiting examples such as aluminum sulfate, poly (aluminum chloride), sodium aluminate, iron (III)-chloride and sulfate, iron (II) sulfate, and sodium silicate (activated silica). The major classes of organic flocculants are non-ionic, cationic and anionic based on the charge on the flocculant molecules: (1) nonionic flocculant, for example, polyethylene oxide, polyacrylamide (PAM), partially hydrolyzed polyacrylamide (HPAM), and dextran; (2) cationic flocculant, for example, poly-quaternary amine resin in water, cationic polyacrylamide, a co-polymer of methacryloylamino-alkyl-trialkylammonium chloride and acrylimide, polyethyleneimine (PEI), polyacrylamide-co-trimethylammonium, ethyl methyl acrylate chloride (PTAMC), and poly (N-methyl-4-vinylpyridinium iodide); and (3) anionic flocculant, comprising carboxylate, sulfate, sulfonate, and phosphate, for example, poly (sodium acrylate), dextran sulfates, and/or high molecular weight ligninsulfonates prepared by a condensation reaction of formaldehyde with ligninsulfonates, and anionic polyacrylamide. Flocculants may individually be or as a combination of one or more flocculants be cationic, anionic, nonionic, or a mixture thereof. Where the synthesis mixture includes the presence of water, it is preferable that the flocculant used is water soluble. Additional information on flocculation is discussed in G. J. Fleer and J. H. M. Scheutjens, *Coagulation and Flocculation Theory and Applications*, ed. by B. Döbias, pp. 209-263, Marcel Dekker, New York, 1993, which is fully incorporated by reference.

Without being bound by any one particular theory, for aqueous dispersions of molecular sieve particles, their surface acquires a charge. Mechanisms for the charging process include (1) specific ion adsorption, i.e., adsorption of cations, which result in a positively charged surface; or adsorption of anions, which leads to a negatively charged surface; (2) differential ion dissolution, i.e., dissolution of cations from the surface make the surface negatively charged; or (3) ionization of surface sites. For metal oxides, including zeolites and molecular sieves, one charging mechanism occurs through the protonation and deprotonation of surface hydroxyl groups according to:

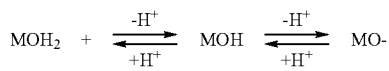

where M stands for the metal oxide surface; its surface charge can be positive at low pH, neutral at a certain pH, and negative at high pH. Therefore, for a given surface, its surface charge can be different depending on the pH of the medium and the presence of other ionic species.

An objective of flocculation is to destabilize the charged particles so that they can form larger aggregates or agglomerates, resulting in a faster settling rate by gravity. This can be achieved by using flocculant that either neutralizes surface charge of the charged particles by adsorption of oppositely charged flocculant molecules or reduction of surface charge by covering up the highly charged surface with less charged or neutral flocculant molecules resulting in lowered apparent surface charge.

When a flocculent is added to the molecular sieve containing synthesis mixture, interactions between flocculant molecules and molecular sieve particles take place. The interaction includes, but is not limited to, electrostatic, chemical, physical, or combinations thereof. For example, a cationic flocculant attracts to a negatively charge molecular sieve particle due to Columbic interactions, or a flocculant molecule can adsorb onto the surface of a molecular sieve due to chemical interaction. For example a basic flocculent molecule will adsorb strongly onto the acid sites of a molecular sieve, or organic moieties tend to adsorb onto a hydrophobic surface.

Without being bound to any one particular theory, interactions between the flocculant and the molecular sieve surface depends not only on the nature of the flocculant but also on the concentration of the flocculant, pH of the medium, and presence of other electrolytes or co-solvents. Large flocculant molecules take different conformations in solution or on a surface depending on their concentration, concentration of other ionic species, or charge site density, and thus, interact differently with molecular sieve particles.

Once the surface of the molecular sieve is modified by flocculant molecules, the modified surface determines interactions between particles. This may lead to, for example, three different scenarios. The first scenario is one in which the flocculant molecules act as bridging media between the particles resulting in the otherwise electrostatically repulsive particles bundling together to achieve flocculation. The second scenario is one in which a flocculant acts as a surface charge neutralizer or reducer, such as an anionic flocculant, to achieve flocculation. Finally, the third scenario is one in which a dual flocculation occurs. This may happen when either one flocculant or a combination of flocculants act to accomplish both the first and second scenarios discussed above. This may be accomplished by the flocculant or a first flocculant achieving surface charge neutralization or reduction. Then that flocculant or a second flocculant achieves bridging of the surface charge neutralized or reduced particles. In the case of oppositely charged flocculants, adding more flocculant can lead to reversal of the surface charge.

In a molecular sieve flocculant mixture, the kinetics of flocculant-particle mixing and the molecular weight of the flocculant may play a role in determining whether bridging flocculation occurs or not. Not being bound by any one particular theory, it may be important to have a high molecular weight flocculant that is capable of sweeping a large volume and collecting many particles. Also, it may be important that multiple particle collisions take place, resulting in more effective surface coverage, before flocculant molecules have an opportunity to relax back to the interface.

The addition of flocculant can lead to flocculation due to bridging of molecular sieve particles by flocculant molecules. Too low a concentration of flocculant added to the synthesis mixture may result in little to no bridging of the molecular sieve particles. However, over-flocculation, or too much flocculant added to the system, can lead to stabilization of the particles due to either steric hindering or an increase in the surface charge due to adsorption of the flocculant, and therefore the bridging between particles is hindered. An appropriate concentration of flocculant can therefore lead to an appropriate amount of bridging due to the adsorption of the flocculant onto the surface of the molecular sieve particles and collisions between the particles.

In terms of flocculation efficiency, the higher the molecular weight of the flocculant the more efficient the flocculation. The efficiency of commercial bridging agents rises significantly when their molecular weights exceed a value of about $10^6$ g/mole. Also, flocculants of high molecular weight also may result in stronger adhesion or adsorption.

Partial coverage of the colliding particles by flocculant molecules is only one precondition necessary for successful bridging. The second one is that the adsorbed flocculant molecules, i.e., their loops and tails, are extended beyond the range of the repulsive double-layer forces.

In certain median polymer concentration ranges, adsorption rate is on the order of particle collision frequency. Thus, on the attachment of partially covered particles, loops and tails of the adsorbed flocculant molecules are able to adsorb on the flocculant-free surface area of another particle.

Presently, the most widely used commercial flocculants are polyacrylamides and their copolymers. The effectiveness of flocculants, i.e., the particle adhesion or flocc stability, depends not only on the polymer concentration and hydrodynamic conditions but also on certain chemical variables, such as (1) solution pH or ionic strength; (2) ionicity or charge density of the bridging agent; and (3) molecular weight of the flocculant.

Flocculant ionicity, or charge density or number of charge groups per flocculant molecule, is an important parameter because it largely determines the flocculation mechanism, which can be bridging or charge patch interaction. It is believed that at most 20%, or at most 15%, or at most 10%, of charge groups in a polymer molecule are optimal for adhesion or adsorption strength and stability of the floc. At higher charge densities, the charge patch mechanism prevails which is characterized by much weaker particle adhesion or low flocc stability than bridging flocculation due to electrostatic interactions of the charge moieties within the flocculant molecule.

For purposes of the specification and the appended claims, charge density is the number of charged monomer units in a polymer of co-polymer. For a 100% charge density flocculant, all of the flocculant's monomer or monomers carry a charge. For a flocculant having a charge density less than 100%, the flocculant comprises charged monomer and non-charged monomer. A co-polymer with a 20% charge density means that 80% of its monomer units do not carry a charge, while the other 20% of its monomer units do carry a charge.

In one embodiment, at least one flocculant may be used to recover the molecular sieve crystals. In one embodiment, the flocculant of the present invention have a charge density of about 5% to about 100%, preferably about 10% to about 99%, more preferably about 20% to about 95%, most preferably about 50% to about 90%. In another embodiment, the flocculant of the present invention has a charge density greater than about 20%, alternatively greater than about 30%, alternatively greater than about 40%, alternatively greater than about 50%, alternatively greater than about 75%. In another embodiment, the flocculant of the present invention have a molecular weight of about 500 to about 50,000,000, about 1,000 to about 40,000,000, about 10,000 to about 30,000,000, about 100,000 to about 10,000,000, or about 500,000 to about 1,000,000. In another embodiment, the flocculant may be cationic, anionic, nonionic, or a mixture thereof.

In another embodiment of the present invention, two flocculants are used to recover the crystalline product. The first flocculant has a charge density of from about 5% to about 100%, about 10% to about 99%, or about 12% to about 95%, and a molecular weight of about 500 to about 1,000,000, about 1,000 to about 500,000, about 10,000 to about 250,000, or about 50,000 to about 125,000. The second flocculant has a charge density of from about 0% to about 20%, preferably about 1% to about 18%, more preferably about 2% to about 16%, or about 5% to about 15%, and a molecular weight of about 50,000 to about 50,000,000, about 100,000 to about 25,000,000, about 200,000 to about 20,000,000, or about 500,000 to about 10,000,000. In another embodiment, the first flocculant and second floccuent may each be cationic, anionic, nonionic, or a mixture thereof.

In another embodiment of the present invention, the second flocculant has a molecular weight greater than the first flocculant. The second flocculant has a molecular weight about 50,000 more than the first flocculant, or a molecular weight about 100,000 more than the first flocculant, or a molecular weight about 500,000 more than the first flocculant. In another embodiment of the present invention, the second flocculant has a charge density less than the first flocculant. The second floccuent has a charge density of about 5% less than the first flocculant, or a charge density of about 10% less than the first flocculant, or a charge density of about 20% less than the first flocculant.

In one embodiment, the recovered molecular sieve comprises from about 0.005 wt % to less than about 10 wt %, or from about 0.01 wt % to about 8 wt %, or from 0.1 wt % to about 6 wt %, or from about 1 wt % to about 5 wt % first flocculant based on the total weight of the recovered molecular sieve. In one embodiment, the recovered molecular sieve comprises from about 0.005 wt % to less than about 10 wt %, or from about 0.01 wt % to about 8 wt %, or from 0.1 wt % to about 6 wt %, or from about 1 wt % to about 5 wt % second flocculant based on the total weight of the recovered molecular sieve. In one embodiment, the ratio of said first flocculant to said second flocculant is 100:1 to 1:100, or 50:1 to 1:50; or 25:1 to 1:25; or 10:1 to 1:10.

Flocculation

Molecular sieve crystalline products, as discussed herein, must be recovered from the synthesis mixture in order to produce the final product, the molecular sieve catalyst. Mechanical means of separation, or recovery, may be used, and include, but are not limited to, centrifugation, filtration, washing, filterpressing, and any other means of mechanically enhancing separation. Gravitational settling or natural settling, may also accomplish recovery of the crystals. These methods, though, are slow and inefficient, and may result in loss of product due to dissolution of the molecular sieve crystalline product under mother liquor conditions at or near ambient temperature. Therefore, a faster more efficient means is necessary.

When commercially recovering any of the molecular sieves discussed above, typically one or more chemical reagents are added to the crystallization vessel or synthesis reactor after crystallization is substantially complete, preferably complete. Optionally, the synthesis mixture is transferred to another vessel separate from the reaction vessel or the vessel in which crystallization occurs, and a flocculant or flocculants are then added to this other vessel from which the crystalline molecular sieve is ultimately recovered. The temperature is above the freezing point of the medium but below the boiling point of the medium. These chemical reagents or flocculants are used to increase the recovery rate of the molecular sieve crystals and increase the recovery yield of the synthesized molecular sieve crystals. While not wishing to be bound to any particular theory, these flocculants act either as (1) a surface charge modifier that results in the agglomeration of very small particles into larger aggregates of molecular sieve particles; (2) surface anchors that bridge many small particles to form aggregates of molecular sieve particles; or (3) spacers to prevent crystals from packing too closely that may restrict liquid flow during filtration and washing. The aggregates of the molecular sieve crystals are then easily recovered by well known techniques such as filtration or through a filter press process.

The flocculant or flocculants are added to the synthesis mixture after crystallization has occurred from the combination of one or more of a silicon source, a phosphorous source, an aluminum source, and a templating agent. The synthesized molecular sieve is then recovered by filtration, however, optionally, the synthesized molecular sieve is washed and additional flocculant or flocculants are used to further aggregate any remaining synthesized molecular sieve from the liquid portion of the synthesis mixture.

The flocculant may be added to the synthesis mixture after crystallization in an amount of about 0.005 wt % to 10 wt % flocculant based on expected solid molecular sieve product yield, crystal size, and presence of nano particles and ionicity of the medium, preferably between about 0.01 wt % to about 8 wt % flocculant based on expected solid molecular sieve product yield, crystal size, and presence of nano particles and ionicity of the medium, more preferably from about 0.012 wt % to about 6 wt % based on expected solid molecular sieve product yield, crystal size, and presence of nano particles and ionicity of the medium. It is preferable that the product slurry and/or flocculant are diluted to obtain a volume of product slurry to volume of flocculant of between 1:100 and 100:1. Good mixing between the product slurry and the flocculant is also preferred. However, too severe mixing is avoided to prevent breaking up of the floccs formed. One can recover the flocculated sieve starting from the total mixture by centrifugation or filtration or one can allow the mixture to settle, decant the liquid, re-slurry with water, diluting, eventually repeatedly decant and re-slurry, and finally recover by filtration or centrifugation. The settling of the sieve can take from minutes to days; however, the settling can be accelerated by adding additional flocculant or use of high molecular weight flocculant. The flocculant is typically added to the slurry at room temperature, and is preferably added as a solution. Should a solid flocculent be used then it is preferable that a substantially homogeneous flocculant solution or suspension or emulsion is prepared by dissolving or dispersing the solid flocculant in a liquid medium.

In one embodiment, one flocculant may be added to the synthesis mixture. A flocculant is added that has a charge density of from about 5% to about 100%, preferably about 10% to about 99%, more preferably about 20% to about 95%, most preferably about 50% to about 90% and a molecular weight of from about 500 to about 50,000,000, about 1,000 to about 40,000,000, about 10,000 to about 30,000,000, about 100,000 to about 10,000,000, or about 500,000 to about 1,000,000. In another embodiment, the flocculant of the present invention has a charge density greater than about 20%, alternatively greater than about 30%, alternatively greater than about 40%, alternatively greater than about 50%, alternatively greater than about 75%. In another embodiment, the flocculant may be cationic, anionic, nonionic, or a mixture thereof.

In one embodiment, the recovered molecular sieve comprises from about 0.005 wt % to less than about 10 wt %, or from about 0.01 wt % to about 8 wt %, or from 0.1 wt % to about 6 wt %, or from about 1 wt % to about 5 wt % flocculant based on the total weight of the recovered molecular sieve. In one embodiment, the rate of settling, or settling rate, of the molecular sieve crystals is from about 1.2 vol. %/hr to about 125 vol. %/hr, or about 1.25 vol. %/hr to about 120 vol. %/hr, or from about 5 vol. %/hr to about 100 vol. %/hr, or from about 8 vol. %/hr to about 90 vol. %/hr, or from about 10 vol. %/hr to about 70 vol. %/hr, or from about 14 vol. %/hr to about 50 vol. %/hr, or from about 20 vol. %/hr to about 30 vol. %/hr. In another embodiment, the molecular sieve synthesis mixture is filtrated after the addition of the flocculant.

In one embodiment, more than one flocculant may be added to the synthesis mixture. A first flocculant is added that has a charge density of about 5% to about 100%, about 10% to about 99%, or about 12% to about 95%, and a molecular weight of about 500 to about 1,000,000, about 1,000 to about 500,000, about 10,000 to about 250,000, or about 50,000 to about 125,000. After the first flocculant is added to the synthesis mixture and properly agitated, the second flocculant is added. The second flocculant has a charge density of from about 0% to about 20%, preferably about 1% to about 18%, more preferably about 2% to about 16%, or about 5% to about 15%, and a molecular weight of about 50,000 to about 50,000,000, about 100,000 to about 25,000,000, about 200,000 to about 20,000,000, or about 500,000 to about 10,000,000. In another embodiment of the present invention, the second flocculant has a molecular weight greater than the first flocculant. The second flocculant has a molecular weight about 50,000 more than the first flocculant, or a molecular weight about 100,000 more than the first flocculant, or a molecular weight about 500,000 more than the first flocculant. In another embodiment of the present invention, the second flocculant has a charge density less than the first flocculant. The second flocculant has a charge density of about 5% less than the first flocculant, or a charge density of about 10% less than the first flocculant, or a charge density of about 20% less than the first flocculant. In another embodiment, the first flocculant and second flocculant may each be cationic, anionic, nonionic, or a mixture thereof.

The total amount of the flocculants added to the synthesis mixture is 0.005 wt %, preferably 0.01 wt %, more preferably 0.015 wt %, or most preferably 0.02 wt % based on the total weight of the synthesis mixture. The recovered molecular sieve comprises from about 0.005 wt % to less than about 10 wt %, or from about 0.01 wt % to about 8 wt %, or from 0.1 wt % to about 6 wt %, or from about 1 wt % to about 5 wt % first flocculant based on the total weight of the recovered molecular sieve. The recovered molecular sieve comprises from about 0.005 wt % to less than about 10 wt %, or from about 0.01 wt % to about 8 wt %, or from 0.1 wt % to about 6 wt %, or from about 1 wt % to about 5 wt % second flocculant based on the total weight of the recovered molecular sieve. The ratio of said first flocculant to said second flocculant is 100:1 to 1:100, or 50:1 to 1:50; or 25:1 to 1:25; or 10:1 to 1:10.

In one embodiment, the rate of settling, or settling rate, of the molecular sieve crystals is from about 1.2 vol. %/hr to about 125 vol. %/hr, or about 1.25 vol. %/hr to about 120 vol. %/hr, or from about 5 vol. %/hr to about 100 vol. %/hr, or from about 8 vol. %/hr to about 90 vol. %/hr, or from about 10 vol. %/hr to about 70 vol. %/hr, or from about 14 vol. %/hr to about 50 vol. %/hr, or from about 20 vol. %/hr to about 30 vol. %/hr. In another embodiment, the molecular sieve synthesis mixture is filtrated after the addition of the second flocculant.

The flocculant may be in a solution or suspension or emulsion or micro-emulsion, preferably an aqueous solution or emulsion or micro-emulsion. Further, the flocculant in the aqueous solution may be diluted with water. Without being bound to any particular theory, it has been found that dilution of the molecular sieve slurry, preferably one recovered using a flocculant, prevents or reduces dissolution of the molecular sieve in the slurry. This benefit provides for a further improvement in yield, and allows for the slurry to be stored for an extended period of time.

A synthesis mixture comprising a molecular sieve and a flocculant has a pH depending on the composition and amount of the molecular sieve, excess amount of template, degree of crystallization and type and amount of flocculent. The synthesis mixture has a pH in the range of from 3 to 10, preferably in the range of from 3.2 to 9.8, and most preferably in the range of from 3.5 to 9.5. Generally, the starting synthesis mixture of alumina, silica, and template is sealed in a vessel and heated, preferably under autogenous pressure, to a temperature in the range of about 80° C. to about 250° C., and more preferably about 150° C. to about 180° C. The time required to form the crystalline molecular sieve is typically from immediately up to several weeks, the duration of which is usually dependent on the temperature; the higher the temperature the shorter the duration. Typically, the crystalline molecular sieve product is formed, usually in a slurry state, and then a flocculant is introduced to this slurry, the synthesis mixture. The crystalline molecular sieve is then recovered by any standard technique well known in the art, for example centrifugation or filtration.

Further, the isolated or separated crystalline product, the synthesized molecular sieve, is washed, typically using a liquid such as water, from one to many times, or in a semi-continuous or continuous way for variable lengths of time. The washed crystalline product is then optionally dried, preferably in air, more preferably in flowing air, to a level such that the resulting, partially dried or dried crystalline product or synthesized molecular sieve has a LOI in the range of about 0.5 weight percent to about 85 weight percent, preferably the range is about greater than about 1 weight percent to about 80 weight percent, more preferably about 5 weight percent to about 75 weight percent, even more preferably about 10 weight percent to about 70 weight percent, and most preferably about 12 weight percent to about 65 weight percent. This moisture containing crystalline product, synthesized molecular sieve or wet filtercake, is then used below in the formulation of the molecular sieve catalyst composition of the invention.

The purpose of adding flocculant is to promote settling of the molecular sieve in the synthesis mixture to allow recovery of the molecular sieve crystalline product slurry from the liquid portion of the synthesis mixture. Increasing the amount of flocculant added to the synthesis mixture increases the rate of settling, thereby reducing the time needed to produce a final formulated catalyst product. However, the addition of more flocculant to the synthesis mixture also increases the viscosity of the molecular sieve crystalline product slurry produced. The addition of too much flocculant results in a molecular sieve crystalline product for which-the processing steps to produce a formulated catalyst product are made more difficult and in some cases impossible. As used herein, "processable" means having a viscosity that facilitates the formulation steps for a particular formulated catalyst product. An effective amount of flocculant is an amount that reduces the settling time when compared to the time required to recover the molecular sieve crystalline product by purely mechanical means but results in a slurry viscosity that can be tolerated in the remaining processing steps to produce a particular formulated catalyst product.

The amount of flocculant introduced to the flocculation vessel, depends on the quantity of molecular sieve being recovered, the type of molecular sieve, the pH of the synthesis mixture, the size of the molecular sieve crystals, etc.

For micro-crystalline materials recovered from a flocculation process, there are some debris deposited on the surface of the micro-crystalline materials. The debris is defined as material that is smaller in size and having a different composition than that of the micro-crystalline product. One way to express the amount of debris on a crystalline material is defined as surface coverage factor ($\Phi$), or debris factor, which is the fraction of the crystalline external surface covered by debris. A molecular sieve crystalline product having a debris factor of less than about 0.4 is preferred, less than about 0.3 more preferred, and less than about 0.2 most preferred. In one embodiment, a correction factor of about 0.75, preferably about 0.80, more preferably about 0.85, even more preferably about 0.90, most preferably about 0.95, and even most preferably about 0.98, is used to adjust the effective amount of flocculant necessary to recover the molecular sieve crystalline product from the synthesis mixture. The correction factor, as used herein, corrects for the viscosity effects associated with the debris deposits on the molecular sieve crystalline product, represented by the debris factor.

Method for Making Molecular Sieve Catalyst Compositions

Once the molecular sieve is synthesized and recovered as described above, depending on the requirements of the particular conversion process, the molecular sieve is then formulated into a molecular sieve catalyst composition, particularly for commercial use. The molecular sieves synthesized above are made or formulated into molecular sieve catalyst compositions by combining the recovered molecular sieves, with a binder, and optionally, but preferably, with a matrix material to form a formulated molecular sieve catalyst composition. It has been found that when thermally treating a synthesized molecular sieve having been recovered in the presence of a flocculant, prior to formulation, the thermal treatment leads to reduction in slurry viscosity and improves the formulated molecular sieve catalyst composition's resistance to attrition in various conversion processes.

This formulated catalyst composition is formed into useful shape and sized particles by well-known techniques such as spray drying, pelletizing, extrusion, and the like, spray drying being the most preferred. It is also preferred that after spray drying for example that the formulated molecular sieve catalyst composition is then calcined.

Binder

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminum chlorohydrate. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide component. For example, an alumina sol will convert to an aluminum oxide following heat treatment.

Aluminum chlorohydrate, a hydroxylated aluminum based sol containing a chloride counter ion, has the general formula of $Al_mO_n(OH)_oCl_p \cdot x(H_2O)$ wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105-144 (1993), which is herein incorporated by reference. In another embodiment, the binders are alumina sols, predominantly comprising aluminum oxide, optionally including some silicon. In yet another embodiment, the binders are peptized alumina made by treating alumina hydrates such as pseudobohemite, with an acid, preferably an acid that does not contain a halogen, to prepare sols or aluminum ion solutions. Non-limiting examples of commercially available colloidal alumina sols include Nalco 8676 available from Nalco Chemical Co., Naperville, Ill., and Nyacol AL20DW, available from Nyacol Nano Technologies, Inc., Ashland, Mass.

In one embodiment, the weight ratio of the binder to the molecular sieve is in the range of about 0.1 to about 0.5, more preferably in the range of from about 0.11 to about 0.48, even more preferably from about 0.12 to about 0.45, yet even more preferably from about 0.13 to less than about 0.45, and most preferably in the range of from about 0.15 to about 0.4. See for example U.S. Patent Application Publication No. U.S. 2003/0181322 published Sep. 25, 2003, which is herein fully incorporated by reference.

Matrix Material

The synthesized molecular sieves described above, in a preferred embodiment, is combined with a binder and one or more matrix material(s). Matrix materials are typically effective in reducing overall catalyst cost, act as thermal sinks assisting in shielding heat from the catalyst composition for example during regeneration, densifying the catalyst composition, increasing catalyst strength such as crush strength and attrition resistance, and to control the rate of conversion in a particular process.

Non-limiting examples of matrix materials include one or more of: rare earth metals, non-active, metal oxides including titania, zirconia, magnesia, thoria, beryllia, quartz, silica or sols, and mixtures thereof, for example silica-magnesia, silica-zirconia, silica-titania, silica-alumina and silica-alumina-thoria. In an embodiment, matrix materials are natural clays such as those from the families of montmorillonite and kaolin. These natural clays include sabbentonites and those kaolins known as, for example, Dixie, McNamee, Georgia and Florida clays. In one embodiment, the matrix material, preferably any of the clays, are subjected to well known modification processes such as calcination and/or acid treatment and/or chemical treatment. In one preferred embodiment, the matrix material is kaolin, particularly kaolin having an average particle size of about 0.1 µm to about 0.6 µm with a $d_{90}$ particle size of less than about 10 µm. Binder may also function as a matrix material. Where the binder functions as a matrix material, a second matrix material may also be added.

Upon combining the molecular sieve and the binder, with a matrix material, in a liquid to form a slurry, mixing, preferably vigorous mixing, is needed to produce a substantially homogeneous mixture containing the flocculated molecular sieves. Non-limiting examples of suitable liquids include one or a combination of water, alcohol, ketones, aldehydes, and/or esters. The most preferred liquid is water. In one embodiment, the slurry is high shear or bead milled for a period of time sufficient to produce the desired slurry texture, particle size, and/or particle size distribution.

The liquid containing the molecular sieve and binder, and the matrix material, are in the same or different liquid, and are combined in any order, together, simultaneously, sequentially, or a combination thereof. In the preferred embodiment, the same liquid, preferably water is used.

Solids Content

The molecular sieve catalyst composition in one embodiment is made by preparing a slurry containing the molecular sieve, a binder, and, optionally while preferably, a matrix material. The solids content of the preferred slurry is about 30% to about 85% by weight. The composition of the solids includes about 10% to about 80% by weight of the molecular sieve, preferably about 20% to about 65% by weight of the molecular sieve, more preferably about 30% to about 60% by weight of the molecular sieve; about 2% to about 25%, preferably about 5% to about 20%, by weight of the binder; and about 10% to about 90%, preferably about 15% to about 85%, by weight of the matrix material.

In another embodiment, the solids content in a slurry comprising the molecular sieve, a binder, and optionally a matrix material, and a liquid medium is in the range of about 40 weight percent to about 80 weight percent, more. preferably in the range of from about 41 weight percent to about 70 weight percent, even more preferably in the range of from about 41.5 weight percent to about 60 weight percent, still even more preferably about 42 weight percent to about 59 weight percent.

The molecular sieve catalyst composition particles contain some water, templating agent or other liquid components, therefore, the weight percents that describe the solid content in the slurry are preferably expressed in terms exclusive of the amount of water, templating agent and removable components upon calcination at elevated temperature. The most preferred condition for measuring solids content is on a calcined basis as, for example, measured by the LOI procedure discussed below. On a calcined basis, the solid content in the slurry, more specifically, the molecular sieve catalyst composition particles in the slurry, are about 20 percent by weight to about 80 percent by weight molecular sieve, about 5 percent by weight to about 20 percent by weight binder, and about 0 percent by weight to about 80 percent by weight matrix material. See for example U.S. Pat. No. 6,787,501, which is herein fully incorporated by reference.

The molecular sieve may be combined with a binder and/or a matrix material forming a slurry such that the pH of the slurry is above or below the isoelectric point (IEP) of the molecular sieve. Preferably the slurry comprises the molecular sieve, the binder and the matrix material and has a pH different from, above or below, preferably below, the IEP of the molecular sieve, the binder and the matrix material. The pH of the slurry may be in the range of from 2 to 7, preferably from 2.3 to 6.2; the IEP of the molecular sieve is in the range of about 2.5 to less than 7, preferably about 2.7 to 6.5; the IEP of the binder is greater than 10; and the IEP of the matrix material is at or less than about 2. See PCT Patent Publication WO 03/000412 A1 published Jan. 3, 2003, which is herein fully incorporated by reference.

As the slurry is mixed, particle size reduction is achieved. It is preferable that these particles are small and have a desired size distribution such that the $d_{90}$ of these particles is less than about 20 µm, preferably less than about 15 µm, more preferably less than about 10 µm, and most preferably about 7 µm. The $d_{90}$ for purposes of this patent application and appended claims means that 90 percent by volume of the particles in the slurry have a particle diameter lower than the $d_{90}$ value. For the purposes of this definition, the particle size distribution used to define the $d_{90}$ is measured using well known laser scattering techniques using a Microtrac Model S3000 particle size analyzer from Microtrac, Inc., Largo, Fla.

The resulting processable molecular sieve crystalline product forms a slurry having a viscosity less than about 10,000 cps, preferably less than about 9,000 cps, more preferably less than about 8,000 cps, and most preferably less than about 7,000 cps. To determine the viscosity of the slurry, the following analytical method is followed by preparing a formulated slurry using the flocculated molecular sieve, which includes, but is not limited to, molecular sieves based on silicon, aluminum, and phosphorous; metal containing molecular sieves; and zeolites.

The viscosity of the slurry is measured using a Brookfield DV-II+Pro Viscometer (Brookfield Instrument Laboratories Inc., Middleboro, Mass.) using a #6 spindle at 10 RPM shear rate. The measurement is carried out at temperatures of 23-24° C. The viscometer is first calibrated with calibration standards having viscosities of 500 cPs, 1000 cPs, and 3000 cPs before taking a measurement of the slurry samples. These calibration standards are certified and are from Brookfield Instrument Laboratories Inc., Middleboro, Mass.

A sample of molecular sieve catalyst is made as follows. The slurry sample having a solids content of 45%, of which 45% being a molecular sieve, 13.5% alumina binder derived from aluminum chlorohydrite (ACH), and 41.5% kaolin clay is prepared by the following procedure. To make 1000 grams of formulated slurry: (1) add 244 grams of an aluminum chlorohydrite (ACH) solution from Reheis Inc., Berkeley Heights, N.J. (LOI: 75.1%) to 224.5 grams of de-ionized water and mix using a Yamato Model 2100 homogenizer (Yamato Scientific America Inc., Orangeburg, N.Y.) at 700 RPM for 5 minutes; (2) add 310 grams of the recovered molecular sieve crystalline product and mix using Yamato mixer at 700 RPM for 10 minutes; then mix using a Silverson L4RT-A high-shear mixer (from Silverson Machines Inc., East Longmeadow, Mass.) at 6000 RPM for 3 minutes; (3) add 221.5 grams of APS Ultrafine clay from Engelhard Corporation, Gordon, Ga. (LOI: 15.69%) while mixing using Yamato mixer at 700 RPM for 10 minutes, then mix using a Silverson L4RT-A in-line mixer at 7500 RPM for 60 passes at a flow rate of 1500 g/min. The slurry is left to equilibrate at room temperature to 23-24° C. then the viscosity is measured.

The slurry of the recovered molecular sieve, binder and matrix material is mixed or milled to achieve a sufficiently uniform slurry of particles of the molecular sieve catalyst composition to form a formulation composition that is then fed to a forming unit that produces the molecular sieve catalyst composition or formulated molecular sieve catalyst composition. In a preferred embodiment, the forming unit is a spray dryer. Typically, the forming unit is maintained at a temperature sufficient to remove most of the liquid from the slurry, and from the resulting molecular sieve catalyst composition. The resulting catalyst composition when formed in this way takes the form of microspheres.

When a spray dryer is used as the forming unit, typically, any one or a combination of the slurries described above, more particularly a slurry of the recovered molecular sieves, binder, and matrix material, is co-fed to the spray dryer with a drying gas with an average inlet temperature ranging from 200° C. to 550° C., and a combined outlet temperature ranging from 70° C. to about 225° C. In an embodiment, the average diameter of the spray dried formed catalyst composition is about 40 μm to about 300 μm, preferably about 50 μm to about 250 μm, more preferably about 50 μm to about 200 μm, and most preferably about 55 μm to about 120 μm.

During spray drying, the slurry is passed through a nozzle distributing the slurry into small droplets, resembling an aerosol spray into a drying chamber. Atomization is achieved by forcing the slurry through a single nozzle or multiple nozzles with a pressure drop in the range of from 100 psia to 1000 psia (690 kPaa to 6895 kPaa). In another embodiment, the slurry is co-fed through a single nozzle or multiple nozzles along with an atomization fluid such as air, steam, flue gas, or any other suitable gas. Generally, the size of the microspheres is controlled to some extent by the solids content of the slurry. However, control of the size of the catalyst composition and its spherical characteristics are controllable by varying the slurry feed properties and conditions of atomization, such as nozzle size, atomization medium, pressure drop, and flow rate.

Other methods for forming a molecular sieve catalyst composition are described in U.S. Pat. No. 6,509,290 (spray drying using a recycled molecular sieve catalyst composition), which is herein incorporated by reference.

In a preferred embodiment, once the molecular sieve catalyst composition is formed, to further harden and/or activate the formed catalyst composition, the spray dried molecular sieve catalyst composition or formulated molecular sieve catalyst composition is calcined. Typical calcination temperatures are in the range of about 500° C. to about 800° C., and preferably about 550° C. to about 700° C., preferably in a calcination environment such as air, nitrogen, helium, flue gas (combustion product lean in oxygen), or any combination thereof. Calcination time is typically dependent on the degree of hardening of the molecular sieve catalyst composition and is in the range of about 15 minutes to about 20 hours at a temperature in the range of from about 500° C. to about 700° C.

In one embodiment, the molecular sieve catalyst composition or formulated molecular sieve catalyst composition has an ARI less than about 10 weight percent per hour, preferably less than about 5 weight percent per hour, preferably less than about 2 weight percent per hour, more preferably less than about 1 weight percent per hour, and most preferably less than about 0.5 weight percent per hour. ARI was calculated as discussed below.

In catalyst manufacturing, water is a key ingredient in all steps of the process, such as, but not limited to, dilution of raw materials, the crystallization step, recovery and washing step, and in the formulation step. The water produced in an oxygenates to chemicals process, such as, but not limited to, oxygenates to olefins and methanol to propylene, is suitable for re-use in any of the above mentioned catalyst manufacturing process steps.

Process for using the Molecular Sieve Catalyst Compositions

The molecular sieve catalyst compositions described above are useful in a variety of processes including: cracking, of for example a naphtha feed to light olefin(s) (U.S. Pat. No. 6,300,537) or higher molecular weight (MW) hydrocarbons to lower MW hydrocarbons; hydrocracking, of for example heavy petroleum and/or cyclic feedstock; isomerization, of for example aromatics such as xylene, polymerization, of for example one or more olefin(s) to produce a polymer product; reforming; hydrogenation; dehydrogenation; dewaxing, of for example hydrocarbons to remove straight chain paraffins; absorption, of for example alkyl aromatic compounds for separating out isomers thereof; alkylation, of for example aromatic hydrocarbons such as benzene and alkyl benzene, optionally with propylene to produce cumeme or with long chain olefins; transalkylation, of for example a combination of aromatic and polyalkylaromatic hydrocarbons; dealkylation; hydrodecylization; disproportionation, of for example toluene to make benzene and paraxylene; oligomerization, of for example straight and branched chain olefin(s); and dehydrocyclization.

Preferred processes are conversion processes including naphtha to highly aromatic mixtures; light olefin(s) to gasoline, distillates and lubricants; oxygenates to olefin(s); light paraffins to olefins and/or aromatics; and unsaturated hydrocarbons (ethylene and/or acetylene) to aldehydes for conversion into alcohols, acids and esters. The most preferred process of the invention is a process directed to the conversion of a feedstock comprising one or more oxygenates to one or more olefin(s).

The molecular sieve catalyst compositions described above are particularly useful in conversion processes of different feedstock. Typically, the feedstock contains one or more aliphatic-containing compounds that include alcohols, amines, carbonyl compounds for example aldehydes, ketones and carboxylic acids, ethers, halides, mercaptans, sulfides, and the like, and mixtures thereof. The aliphatic moiety of the aliphatic-containing compounds typically contains from 1 to about 50 carbon atoms, preferably from 1 to 20 carbon atoms, more preferably from 1 to 10 carbon atoms, and most preferably from 1 to 4 carbon atoms.

Non-limiting examples of aliphatic-containing compounds include: alcohols such as methanol and ethanol, alkyl-mercaptans such as methyl mercaptan and ethyl mercaptan, alkyl-sulfides such as methyl sulfide, alkyl-amines such as methyl amine, alkyl-ethers such as dimethyl ether, diethyl ether and methylethyl ether, alkyl-halides such as methyl chloride and ethyl chloride, alkyl ketones such as dimethyl ketone, formaldehydes, and various acids such as acetic acid.

In an embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In the most preferred embodiment, the feedstock is selected from one or more of methanol, ethanol, dimethyl ether, diethyl ether or a combination thereof, more preferably methanol and dimethyl ether, and most preferably methanol.

The various feedstocks discussed above, particularly a feedstock containing an oxygenate, more particularly a feedstock containing an alcohol, is converted primarily into one or more olefin(s). The olefin(s) or olefin monomer(s) produced from the feedstock typically have from 2 to 30 carbon atoms, preferably 2 to 8 carbon atoms, more preferably 2 to 6 carbon atoms, still more preferably 2 to 4 carbons atoms, and most preferably ethylene and/or propylene. Non-limiting examples of olefin monomer(s) include ethylene, propylene, butene-1, pentene-1,4-methyl-pentene-1, hexene-1, octene-1 and decene-1, preferably ethylene, propylene, butene-1, pentene-1,4-methyl-pentene-1, hexene-1, octene-1 and isomers thereof. Other olefin monomer(s) include unsaturated monomers, diolefins having 4 to 18 carbon atoms, conjugated or nonconjugated dienes, polyenes, vinyl monomers and cyclic olefins.

In the most preferred embodiment, the feedstock, preferably of one or more oxygenates, is converted in the presence of a molecular sieve catalyst composition of the invention into olefin(s) having 2 to 6 carbons atoms, preferably 2 to 4 carbon atoms. Most preferably, the olefin(s), alone or combination, are converted from a feedstock containing an oxygenate, preferably an alcohol, most preferably methanol, to the preferred olefin(s) ethylene and/or propylene.

The are many processes used to convert feedstock into olefin(s) including various cracking processes such as steam cracking, thermal regenerative cracking, fluidized bed cracking, fluid catalytic cracking, deep catalytic cracking, and visbreaking. The most preferred process is generally referred to as gas-to-olefins (GTO) or alternatively, oxygenate-to-olefins (OTO) or methanol-to-olefins (MTO). In a MTO or an OTO process, typically an oxygenated feedstock, most preferably a methanol containing feedstock, is converted in the presence of a molecular sieve catalyst composition into one or more olefin(s), preferably and predominantly, ethylene and/or propylene, often referred to as light olefin(s).

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The process for converting a feedstock, especially a feedstock containing one or more oxygenates, in the presence of a molecular sieve catalyst composition of the invention, is carried out in a reaction process in a reactor, where the process is a fixed bed process, a fluidized bed process (includes a turbulent bed process), preferably a continuous fluidized bed process, and most preferably a continuous high velocity fluidized bed process.

The reaction processes can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and *Fluidization Engineering*, D. Kunii and O. Levenspiel, Robert E. Krieger Publishing Company, New York, N.Y. 1977, which are all herein fully incorporated by reference. The preferred reactor type are riser reactors generally described in *Riser Reactor, Fluidization and Fluid-Particle Systems*, pages 48 to 59, F. A. Zenz and D. F. Othmer, Reinhold Publishing Corporation, New York, 1960, and U.S. Pat. No. 6,166,282 (fast-fluidized bed reactor), and U.S. patent application Ser. No. 09/564,613 filed May 4, 2000 (multiple riser reactor), which are all herein fully incorporated by reference.

In the preferred embodiment, a fluidized bed process or high velocity fluidized bed process includes a reactor system, a regeneration system and a recovery system.

Reactor System

The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

The feedstock entering the reactor system is preferably converted, partially or fully, in the first reactor zone into a gaseous effluent that enters the disengaging vessel along with a coked or further coked molecular sieve catalyst composition. In the preferred embodiment, cyclone(s) within the disengaging vessel are designed to separate the molecular sieve catalyst composition, preferably a coked or further coked molecular sieve catalyst composition, from the gaseous effluent containing one or more olefin(s) within the disengaging zone. Cyclones are preferred, however, gravity effects within the disengaging vessel will also separate the catalyst compositions from the gaseous effluent. Other methods for separating the catalyst compositions from the gaseous effluent include the use of plates, caps, elbows, and the like.

In one embodiment of the disengaging system, the disengaging system includes a disengaging vessel, typically a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel.

The conversion temperature employed in the conversion process, specifically within the reactor system, is in the range of about 200° C. to about 1000° C., preferably about 250° C. to about 800° C., more preferably about 250° C. to about 750° C., yet more preferably about 300° C. to about 650° C., yet even more preferably about 350° C. to about 600° C., and most preferably about 350° C. to about 550° C.

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of about 0.1 kPaa to about 5 MPaa, preferably about 5 kPaa to about 1 MPaa, and most preferably about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidized state within a reactor. Typically, the WHSV is in the range of about 1 $hr^{-1}$ to about 5000 $hr^{-1}$, preferably about 2 $hr^{-1}$ to about 3000 $hr^{-1}$, more preferably about 5 $hr^{-1}$ to about 1500 $hr^{-1}$, and most preferably about 10 $hr^{-1}$ to about 1000 $hr^{-1}$. In one preferred embodiment, the WHSV is greater than 20 $hr^{-1}$, preferably the WHSV for conversion of a feedstock containing methanol and dimethyl ether is in the range of about 20 $hr^{-1}$ to about 300 $hr^{-1}$.

The superficial gas velocity (SGV) of the feedstock including diluent and reaction products within the reactor system is preferably sufficient to fluidize the molecular sieve catalyst composition within a reaction zone in the reactor. The SGV in the process, particularly within the reactor system, more particularly within the riser reactor(s), is at least 0.1 meter per second (m/sec), preferably greater than 0.5 m/sec, more preferably greater than 1 m/sec, even more preferably greater than 2 m/sec, yet even more preferably greater than 3 m/sec, and most preferably greater than 4 m/sec. See for example U.S. Pat. No. 6,552,240, which is herein incorporated by reference. Other processes for converting an oxygenate to olefin(s) are described in U.S. Pat. No. 5,952,538 (WHSV of at least 20 $hr^{-1}$ and a Temperature Corrected Normalized Methane Selectivity (TCNMS) of less than 0.016), EP-0 642 485 B1 (WHSV is from 0.01 $hr^{-1}$ to about 100 $hr^{-1}$, at a temperature of about 350° C. to 550° C.), and PCT WO 01/23500 published Apr. 5, 2001 (propane reduction at an average catalyst feedstock exposure of at least 1.0), which are all herein fully incorporated by reference.

The coked molecular sieve catalyst composition is withdrawn from the disengaging vessel, preferably by one or more cyclones(s), and introduced to the regeneration system.

Regeneration System

The regeneration system comprises a regenerator where the coked catalyst composition is contacted with a regeneration medium, preferably a gas containing oxygen, under general regeneration conditions of temperature, pressure and residence time. Non-limiting examples of the regeneration medium include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. The regeneration conditions are those capable of burning coke from the coked catalyst composition, preferably to a level less than 0.5 weight percent based on the total weight of the coked molecular sieve catalyst composition entering the regeneration system. The coked molecular sieve catalyst composition withdrawn from the regenerator forms a regenerated molecular sieve catalyst composition. By controlling the flow of the regenerated molecular sieve catalyst composition or cooled regenerated molecular sieve catalyst composition from the regeneration system to the reactor system, the optimum level of coke on the molecular sieve catalyst composition entering the reactor is maintained. There are many techniques for controlling the flow of a molecular sieve catalyst composition described in Michael Louge, *Experimental Techniques, Circulating Fluidized Beds*, Grace, Avidan and Knowlton, eds., Blackie, 1997 (336-337), which is herein incorporated by reference.

The regeneration temperature is in the range of about 200° C. to about 1500° C., preferably about 300° C. to about 1000° C., more preferably about 450° C. to about 750° C., and most preferably about 550° C. to about 700° C. The regeneration pressure is in the range of about 15 psia (103 kPaa) to about 500 psia (3448 kPaa), preferably about 20 psia (138 kPaa) to about 250 psia (1724 kPaa), more preferably about 25 psia (172kPaa) to about 150 psia (1034 kPaa), and most preferably about 30 psia (207 kPaa) to about 60 psia (414 kPaa). The preferred residence time of the molecular sieve catalyst composition in the regenerator is in the range of about one minute to several hours, most preferably about one minute to 100 minutes, and the preferred volume of oxygen in the gas is in the range of about 0.01 mole percent to about 5 mole percent based on the total volume of the gas.

Other regeneration processes are described in U.S. Pat. Nos. 6,023,005 (coke levels on regenerated catalyst), U.S. Pat. No. 6,245,703 (fresh molecular sieve added to regenerator) and U.S. Pat. No. 6,290,916 (controlling moisture), U.S. Pat. No. 6,613,950 (cooled regenerated catalyst returned to regenerator), U.S. Pat. No. 6,441,262 (regenerated catalyst contacted with alcohol), and PCT WO 00/49106 published Aug. 24, 2000 (cooled regenerated catalyst contacted with by-products), which are all herein fully incorporated by reference.

The gaseous effluent is withdrawn from the disengaging system and is passed through a recovery system.

Recovery System

There are many well known recovery systems, techniques and sequences that are useful in separating olefin(s) and purifying olefin(s) from the gaseous effluent. Recovery systems generally comprise one or more or a combination of a various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment for example various condensers, heat exchangers, refrigeration systems or chill trains, compressors, knock-out drums or pots, pumps, and the like. Non-limiting examples of these towers, columns, splitters or trains used alone or in combination include one or more of a demethanizer, preferably a high temperature demethanizer, a dethanizer, a depropanizer, preferably a wet depropanizer, a wash tower often referred to as a caustic wash tower and/or quench tower, absorbers, adsorbers, membranes, ethylene (C2) splitter, propylene (C3) splitter, butene (C4) splitter, and the like.

Various recovery systems useful for recovering predominately olefin(s), preferably prime or light olefin(s) such as ethylene, propylene and/or butene are described in U.S. Pat. No. 5,960,643 (secondary rich ethylene stream), U.S. Pat. Nos. 5,019,143, 5,452,581 and 5,082,481 (membrane separations), U.S. Pat. No. 5,672,197 (pressure dependent adsorbents), U.S. Pat. No. 6,069,288 (hydrogen removal), U.S. Pat.

No. 5,904,880 (recovered methanol to hydrogen and carbon dioxide in one step), U.S. Pat. No. 5,927,063 (recovered methanol to gas turbine power plant), and U.S. Pat. No. 6,121,504 (direct product quench), U.S. Pat. No. 6,121,503 (high purity olefins without superfractionation), and U.S. Pat. No. 6,293,998 (pressure swing adsorption), which are all herein fully incorporated by reference.

In particular with a conversion process of oxygenates into olefin(s) utilizing a molecular sieve catalyst composition the resulting effluent gas typically comprises a majority of ethylene and/or propylene and a minor amount of four carbon and higher carbon number products and other by-products, excluding water. In one embodiment, high purity ethylene and/or high purity propylene is produced by the process of the invention at a rate greater than 4,500 kg per day, preferably greater than 100,000 kg per day, more preferably greater than 500,000 kg per day, even more preferably greater than 1,000,000 kg per day, yet even more preferably greater than 1,500,000 kg per day, still even more preferably greater than 2,000,000 kg per day, and most preferably greater than 2,500,000 kg per day.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system to remove various non-limiting examples of contaminants and by-products including, but not limited to, generally polar compounds such as water, alcohols, carboxylic acids, ethers, carbon oxides, ammonia and other nitrogen compounds, chlorides, hydrogen and hydrocarbons such as acetylene, methyl acetylene, propadiene, butadiene and butyne.

Other recovery systems that include purification systems, for example for the purification of olefin(s), are described in *Kirk-Othmer Encyclopedia of Chemical Technology, 4th Edition*, Volume 9, John Wiley & Sons, 1996, pages 249-271 and 894-899, which is herein incorporated by reference. Purification systems are also described in for example, U.S. Pat. No. 6,271,428 (purification of a diolefin hydrocarbon stream), U.S. Pat. No. 6,293,999 (separating propylene from propane), and U.S. Pat. No. 6,593,506 (purge stream using hydrating catalyst), which is herein incorporated by reference.

Included in the recovery systems of the invention are reaction systems for converting the products contained within the effluent gas withdrawn from the reactor or converting those products produced as a result of the recovery system utilized. Suitable well known reaction systems as part of the recovery system primarily take lower value products such as the $C_4$ hydrocarbons, butene-1 and butene-2 and convert them to higher value products. Non-limiting examples of these types of reaction systems include U.S. Pat. No. 5,955,640 (converting a four carbon product into butene-1), U.S. Pat. No. 4,774,375 (isobutane and butene-2 oligomerized to an alkylate gasoline), U.S. Pat. No. 6,049,017 (dimerization of n-butylene), U.S. Pat. Nos. 4,287,369 and 5,763,678 (carbonylation or hydroformulation of higher olefins with carbon dioxide and hydrogen making carbonyl compounds), U.S. Pat. No. 4,542,252 (multistage adiabatic process), U.S. Pat. No. 5,634,354 (olefin-hydrogen recovery), and Cosyns, J. et al., *Process for Upgrading $C_3$, $C_4$ and $C_5$ Olefinic Streams*, Pet. & Coal, Vol. 37, No. 4 (1995) (dimerizing or oligomerizing propylene, butylene and pentylene), which are all herein fully incorporated by reference.

Other conversion processes, in particular, a conversion process of an oxygenate to one or more olefin(s) in the presence of a molecular sieve catalyst composition, especially where the molecular sieve is synthesized from a silicon-, phosphorous-, and alumina- source, include those described in for example: U.S. Pat. No. 6,121,503 (making plastic with an olefin product having a paraffin to olefin weight ratio less than or equal to 0.05), U.S. Pat. No. 6,187,983 (electromagnetic energy to reaction system), PCT WO 99/18055 publishes Apr. 15, 1999 (heavy hydrocarbon in effluent gas fed to another reactor) PCT WO 01/60770 published Aug. 23, 2001 and U.S. Pat. No. 6,441,261 (high pressure), U.S. patent application Ser. No. 09/507,838 filed Feb. 22, 2000 (staged feedstock injection), and U.S. Pat. No. 6,518,475 (acetone co-fed), which are all herein fully incorporated by reference.

Integrated Processes

In an embodiment, an integrated process is directed to producing light olefin(s) from a hydrocarbon feedstock, preferably a hydrocarbon gas feedstock, more preferably methane and/or ethane. The first step in the process is passing the gaseous feedstock, preferably in combination with a water stream, to a syngas production zone to produce a synthesis gas (syngas) stream. Syngas production is well known, and typical syngas temperatures are in the range of about 700° C. to about 1200° C. and syngas pressures are in the range of about 2 MPa to about 100 MPa. Synthesis gas streams are produced from natural gas, petroleum liquids, and carbonaceous materials such as coal, recycled plastic, municipal waste or any other organic material, preferably synthesis gas stream is produced via steam reforming of natural gas. Generally, a heterogeneous catalyst, typically a copper based catalyst, is contacted with a synthesis gas stream, typically carbon dioxide and carbon monoxide and hydrogen to produce an alcohol, preferably methanol, often in combination with water. In one embodiment, the synthesis gas stream at a synthesis temperature in the range of about 150° C. to about 450° C. and at a synthesis pressure in the range of about 5 MPa to about 10 MPa is passed through a carbon oxide conversion zone to produce an oxygenate containing stream.

This oxygenate containing stream, or crude methanol, typically contains the alcohol product and various other components such as ethers, particularly dimethyl ether, ketones, aldehydes, dissolved gases such as hydrogen methane, carbon oxide and nitrogen, and fusel oil. The oxygenate containing stream, crude methanol, in the preferred embodiment is passed through well known purification processes, distillation, separation and fractionation, resulting in a purified oxygenate containing stream, for example, commercial Grade A and AA methanol. The oxygenate containing stream or purified oxygenate containing stream, optionally with one or more diluents, is contacted with one or more molecular sieve catalyst compositions described above in any one of the processes described above to produce a variety of prime products, particularly light olefin(s), ethylene and/or propylene. Non-limiting examples of this integrated process is described in EP-B-0 933 345, which is herein fully incorporated by reference. In another more fully integrated process, optionally with the integrated processes described above, olefin(s) produced are directed to, in one embodiment, one or more polymerization processes for producing various polyolefins. (See for example U.S. patent application Ser. No. 09/615,376 filed Jul. 13, 2000, which is herein fully incorporated by reference.)

Light Olefin Usage

The light olefin products, especially the ethylene and the propylene, are useful in polymerization processes that include solution, gas phase, slurry phase and high pressure processes, or a combinations thereof. Particularly preferred is a gas phase or a slurry phase polymerization of one or more olefin(s) at least one of which is ethylene or propylene. These polymerization processes utilize a polymerization catalyst that can include any one or a combination of the molecular sieve catalysts discussed above, however, the preferred polymerization catalysts are those Ziegler-Natta, Phillips-type, metallocene, metallocene-type and advanced polymerization catalysts, and mixtures thereof. The polymers produced by the polymerization processes described above include linear low density polyethylene, elastomers, plastomers, high density polyethylene, low density polyethylene, polypropylene and polypropylene copolymers. The propylene based polymers produced by the polymerization processes include atactic polypropylene, isotactic polypropylene, syndiotactic polypropylene, and propylene random, block or impact copolymers.

In an embodiment, the integrated process comprises a polymerizing process of one or more olefin(s) in the presence of a polymerization catalyst system in a polymerization reactor to produce one or more polymer products, wherein the one or more olefin(s) having been made by converting an alcohol, particularly methanol, using a molecular sieve catalyst composition. The preferred polymerization process is a gas phase polymerization process and at least one of the olefins(s) is either ethylene or propylene, and preferably the polymerization catalyst system is a supported metallocene catalyst system. In this embodiment, the supported metallocene catalyst system comprises a support, a metallocene or metallocene-type compound and an activator, preferably the activator is a non-coordinating anion or alumoxane, or combination thereof, and most preferably the activator is alumoxane.

In addition to polyolefins, numerous other olefin derived products are formed from the olefin(s) recovered by any one of the processes described above, particularly the conversion processes, more particularly the GTO process or MTO process. These include, but are not limited to, aldehydes, alcohols, acetic acid, linear alpha olefins, vinyl acetate, ethylene dichloride and vinyl chloride, ethylbenzene, ethylene oxide, cumene, isopropyl alcohol, acrolein, allyl chloride, propylene oxide, acrylic acid, ethylene-propylene rubbers, and acrylonitrile, and trimers and dimers of ethylene, propylene or butylenes.

EXAMPLES

Test Methods

The charge density of flocculants is determined as follows. Flocculant molecules used in flocculation processes can be neutral, positively charged, or negatively charged. Measurement of charge is defined as charge density. Most flocculants are polymers or co-polymers. For a cationic flocculant, a charge density of 100% means that each monomer molecule carries a positive charge. For example, Cytec Industries C-591 is a cationic flocculant having a molecular weight of 400,000 and a charge density of 100%. It is a polymer of diallyl, di-methylammonium chloride (DADMAC).

A charge density of 2.5% means that 2.5% of the co-monomer is charged. For example, Cytec Industries Super-floc C-1555M, is a polymer 2.5% methacryloylamino-n-propyl-trimethylammonium chloride as one monomer and acrylimide as the other. It has a molecular weight of 6,000,000.

Charge density can be measured if two or more monomers in a co-polymer flocculant have distinct structural differences that can be used to quantify the corresponding fraction, for example, if the charged monomer has a benzene unit in it while the other monomer does not have a benzene unit in it, then the number of benzene unites in the co-polymer product can be used to determine the charge density. For this example, charge density=(number of benzene unites)/(number of benzene units+non-benzene-units)*100. If a co-polymer of benzene-containing monomer and a non-benzene containing monomer gives 10,000 benzene units and 10,000 non-benzene units based on structural analysis through H-NMR or $^{13}$C-NMR or UV, then it has a charge density of (10,000/(10,000+10,000)*100=50%.

Determination of the percentage of liquid or liquid medium and the percentage of template for purposes of this patent specification and appended claims uses a Thermal Gravimetric Analysis (TGA) measurement as follows: An amount of a molecular sieve material, the sample, is loaded into a sample pan of a Cahn TG-121 Microbalance, available from Cahn Instrument, Inc., Cerritos, Calif. During the TGA technique, a flow of 114 cc/min (STP) air was used. The sample is then heated from 25° C. to 180° C. at 30° C./min, held at 180° C. for 3 hours or until the weight of this sample becomes constant. The weight loss is defined as the Loss on Drying (LOD) and represents the fraction of the original sample that is principally water or other liquid medium. Subsequently, the sample is heated at 30° C./min from 180° C. to 650° C. and held at 650° C. for 2 hours. This second loss in weight is considered to be due to removing the template contained in the sieve crystals. The sum of these two losses relative to the initial sample weight is defined as the Loss-On-Ignition (LOI).

In order to provide a better understanding of the present invention including representative advantages thereof, the following examples are offered.

Formulation

A standard formulation protocol called for making a 45% solids, consisting of 45% molecular sieve, 13.5% binder, Al$_2$O$_3$-derived from aluminum chlorohydrate (ACH), and 41.5% kaolin clay. The sequence of material addition was (1) adding ACH powder or ACH solution to de-ionized water; (2) adding the molecular sieve to the diluted ACH solution of (1) while mixing using a Yamato homogenizer LR400D (from Yamato Scientific America Inc., Orangeburg, N.Y.) at 600-800 RPM; then mixing using a Silverson high-shear mixer L4RT-A (from Silverson Machines, Inc., East Longmeadow, Mass.) at 6000 RPM for 3 minutes; (3) adding kaolin clay (Ultrafine from Engelhard, Iselin, N.J.) to the above mixture while mixing using a Yamato homogenizer at 600-800 RPM; then mixing using a Silverson high-shear mixer L4RT-A (from Silverson Machines, Inc., East Longmeadow, Mass.) at 6000 RPM for 3 minutes. Finally, the slurry was milled using a Silverson high-shear in-line mixer at 6,000-7,500 RPM for 60 passes. The milled slurry was then cooled down to 23° C. for viscosity characterization. Viscosity measurements were taken using a Brookfield DV-II+Pro viscometer (from Brookfield Engineering Laboratories, Inc., Middleboro, Mass.) using a #6 spindle at 23-24° C.

Flocculation Experiment Setup and Settling Rate Measurement

A slurry sample removed from the crystallizer that was kept at crystallization conditions, i.e., 165° C., was cooled down to room temperature before flocculation experiments were carried out. This slurry contained 22% crystalline product. Settling experiments were conducted using a 500 cc graduated cylinder, Kimax®, from Kimble Glass Inc., Vineland, N.J. Its dimensions were: inner diameter, 44 mm; and total height, 360 mm. Unless otherwise stated, flocculation was conducted to achieve a total dilution ratio of 100 cc of slurry and 300 cc of water plus flocculant solution.

Typically, an amount of 100 cc of sample slurry was added to the Kimax® cylinder, then diluted with 100-300 cc of de-ionized water plus flocculant solution. Each time a liquid was added the entire content in the cylinder was mixed by shaking the cylinder vigorously while flipping the cylinder upside down 3 to 6 times. Once all the flocculant was added and the dilution ratio achieved, the cylinder was left on a counter top for settling. Under flocculation conditions, the solid-rich phase settled to the bottom while the top-layer became clearer or solid-deficient. In most cases, a distinct phase boundary was easily identified. The settling rate was defined as percent of volume settled (top clear layer) in total volume per hour. For example, in a flocculation experiment where 250 cc volume was settled out of a 500 cc total volume in 120 minutes, the measured settling rate would be (250/500/120*60*100)=25 vol. %/hr. The higher the settling rate the faster the flocculated system settled.

Filtration Set-Up

Commercial filtration can be achieved by, e.g., filterpressing, a process where a filtercake is formed on a filtering medium, for instance, filter cloth on a support, then pressure is applied to force excess water or liquid out of the filtercake. In order to mimic the commercial process in a laboratory setting, a Buchner funnel was chosen as the filtration vessel and support. The Buchner funnel had a flat bottom and a diameter of 185 mm having holes of 2 mm. A #542 hardened ashless filter paper from Whatman (from Whatman Inc., Clifton, N.J.) was used for filtration. The flask where the Buchner funnel was mounted was pulled by vacuum. The quality of filtration was judged based on the speed of filtration (amount of liquid coming out of the filter per unit time) and the clarity of the filtrate. The faster the filtration, the clearer the filtrate was.

Example 1

500 cc of a slurry containing 22% of an AEI/CHA SAPO intergrowth molecular sieve was left to settle in a cylindrical glass jar having dimensions of 80 mm inner diameter and 120 mm height for 15 hours. The settling rate measured was 1.2% vol./hr.

Example 2

An amount of 100 g of slurry containing 22% of an AEI/CHA SAPO intergrowth molecular sieve (with a silica to alumina ratio of 0.15 based on gel composition) was flocculated in the 500 cc graduated cylinder according to the flocculation protocol outlined above, by adding (a) 11 g of 0.4 wt % Cytec Superfloc C-591 (calculated based on actual flocc content of the as-received product from Cytec Industries Inc., West Paterson, N.J.), and (b) 0.66 g of 0.3 wt % Cytec Superfloc C-1555 (calculated based on actual flocc content of the as-received product from Cytec Industries, Inc., West Paterson, N.J.) to give 2000 ppm of C-591 and 90 ppm of C-1555 on the AEI/CHA SAPO intergrowth molecular sieve. Superfloc C-591 is a polyquaternary ammonium resin while C-1555 is a cationic polyacrylamide. The settling rate measured was 9.3% vol./hr. After settling, the settled layer was filtered.

Example 3

An amount of 100 g of slurry containing 22% of an AEI/CHA SAPO intergrowth molecular sieve was flocculated in the 500 cc graduated cylinder according to the flocculation protocol outlined above, by adding (a) 11 g of 0.4 wt % Cat Floc L (calculated based on actual flocc content of the as-received product from Nalco Chemical Inc., Sugarland, Tex.), and (b) 1.34 g of 0.3 wt % Cytec Superfloc C-1555 (calculated based on actual flocc content of the as-received product from Cytec Industries, Inv., West Paterson, N.J.) to give 2000 ppm of Cat Floc L and 183 ppm of C-1555 on the AEI/CHA SAPO intergrowth molecular sieve. The settling rate measured was 14.7% vol./hr. Cat Floc L is a cationic diallyl dimethyl ammonium chloride (DADMAC) polymer.

Example 4

An amount of 100 g of slurry containing 22% of an AEI/CHA SAPO intergrowth molecular sieve was flocculated in the 500 cc graduated cylinder according to the flocculation protocol outlined above, by adding (a) 100 g of 0.4 wt % Cat Floc L (calculated based on actual flocc content of the as-received product from Nalco Chemical Inc., Sugarland, Tex.), and (b) 2.64 g of 0.3 wt % Cytec Superfloc C-1555 (calculated based on actual flocc content of the as-received product from Cytec Industries, Inv., West Paterson, N.J.) to give 18182 ppm of Cat Floc L and 360 ppm of C-1555 on the AEI/CHA SAPO intergrowth molecular sieve. The settling rate measured was 87.6% vol./hr.

Example 5

An amount of 100 g of slurry containing 22% of an AEI/CHA SAPO intergrowth molecular sieve was flocculated in the 500 cc graduated cylinder according to the flocculation protocol outlined above, by adding (a) 100 g of 0.4 wt % Cytec Superfloc C-591 (from Cytec Industries, Inc., West Paterson, N.J.), and (b) 2.65 g of 0.3 wt % Cytec Superfloc C-1555 (from Cytec Industries, Inv., West Paterson, N.J.) to give 18182 ppm of C-591 and 361 ppm of C-1555 on the AEI/CHA SAPO intergrowth molecular sieve. The settling rate measured was 123% vol./hr. However, when the settled layer was filtered, the filtration was very slow, indicating an unsuccessful flocculation from the point of view of overall recovery process.

Example 6

An amount of 600 g of slurry containing 22% of an AEI/CHA SAPO intergrowth molecular sieve was flocculated in a one gallon plastic jar by first adding 600 g of de-ionized water, then 150 g of 0.8 wt % Cat Floc L (from Nalco Chemical Inc., Sugarland, Tex.) solution, then 750 g of de-ionized water into the molecular sieve slurry, followed with 42 g of 0.3 wt % Cytec Superfloc C-1555 (from Cytec Industries, Inc., West Paterson, N.J.) solution, finally, 600 g of de-ionized water to the container to give 9091 ppm of Cat Floc L and 954 ppm of C-1555 on the AEI/CHA SAPO intergrowth molecular sieve. The mixture was settled overnight. The top layer was decanted off and the bottom layer was sent through a Buckner funnel for filtration. The filtration rate was 1364 cc/hr and there was a clear filtrate. This represents a successful recovery in terms of flocculation and filtration.

Examples 7-12

Flocculation using a single flocculant, C-591 (from Cytec Industries, Inc., West Paterson, N.J.) was conducted. Flocculation experiments were carried out in 500 cc graduated cylinder. An amount of 100 cc of slurry containing 22% of an AEI/CHA SAPO intergrowth molecular sieve was added to the 500 cc graduated cylinder, then diluted by adding 200 g of de-ionized water; followed by adding a pre-diluted flocculant solution made by combining a given amount of 2% C-591 solution and 100 g of de-ionized water to give 4000 ppm, 6000 ppm, 9000 ppm, 16000 ppm, 24000 ppm and 36000 ppm of C-591 on the AEI/CHA SAPO intergrowth molecular sieve. The system was mixed by shaking for at least 30 times, then allowed to settle. Settling rate (vol. %/hr) of these flocculation examples is presented in Table 1. At flocculent levels of 4,000 to 9,000 ppm, the settling rage was at 12-13 vol %/hr. However, at flocculent levels at or greater than 16,000 ppm, settling rate was significantly reduced. It is believed that the reduction in settling rate at high C-591 levels is due to stabilization of the molecular sieve particles by covering the particle surface, giving rise to flocculant over-dosing.

0.5% N-1986 solution and 100 g of de-ionized water to give 1000 ppm N-1986 on the AEI/CHA SAPO intergrowth molecular sieve, then 4000 ppm of cationic flocculant C-591 was added. The system was mixed by shaking for at least 30 times, then allowed to settle. The settling rate measured was 27.2 vol. %/hr.

Example 15

Flocculation using a combination of non-ionic flocculant and a cationic flocculant was conducted. Flocculation experiments were carried out in 500 cc graduated cylinder. An amount of 100 cc of slurry containing 22% of an AEI/CHA SAPO intergrowth molecular sieve was added to the 500 cc graduated cylinder, then diluted by adding 200 g of de-ionized water; followed by adding a pre-diluted non-ionic

TABLE 1

Impact of Flocculant C-591 Level on Settling Rate of AEI/CHA SAPO Intergrowth Molecular Sieve Slurry at 5% Solids Content

| Example | Flocculant | Qty. of Slurry (cc) | Deionized H$_2$O (cc) | Conc. Of Flocculant (wt %) | Qty. of Flocculant (g) | H$_2$O for Diluting Flocculant (cc) | Flocculant on Solids (ppm) | Relative Settling Rate (vol. %/hr) |
|---|---|---|---|---|---|---|---|---|
| #7 | Cytec C-591 | 100 | 200 | 2 | 5.5 | 100 | 4000 | 12.1 |
| #8 | Cytec C-591 | 100 | 200 | 2 | 8.25 | 100 | 6000 | 13.3 |
| #9 | Cytec C-591 | 100 | 200 | 2 | 12.375 | 100 | 9000 | 12.9 |
| #10 | Cytec C-591 | 100 | 200 | 2 | 22 | 100 | 16000 | 8.2 |
| #11 | Cytec C-591 | 100 | 200 | 2 | 33 | 100 | 24000 | 5.3 |
| #12 | Cytec C-591 | 100 | 200 | 2 | 49.5 | 100 | 36000 | 1.3 |

Example 13

Flocculation using a non-ionic flocculant was conducted. Flocculation experiments were carried out in 500 cc graduated cylinder. An amount of 100 cc of slurry containing 22% of an AEI/CHA SAPO intergrowth molecular sieve was added to the 500 cc graduated cylinder, then diluted by adding 200 g of de-ionized water; followed by adding a pre-diluted non-ionic (charge density ~0%) N-1986 (a polyacrylamide having a molecular weight of 12,000,000 from Cytec Industries, Inc., West Paterson, N.J.) flocculant solution made by combining a given amount of 0.5% N-1986 solution and 100 g of de-ionized water to give 1000 ppm N-1986 on the AEI/CHA SAPO intergrowth molecular sieve. The system was mixed by shaking for at least 30 times, then allowed to settle. The settling rate measured was 12.8 vol. %/hr.

Example 14

Flocculation using a combination of non-ionic flocculant and a cationic flocculant was conducted. Flocculation experiments were carried out in 500 cc graduated cylinder. An amount of 100 cc of slurry containing 22% of an AEI/CHA SAPO intergrowth molecular sieve was added to the 500 cc graduated cylinder, then diluted by adding 200 g of de-ionized water; followed by adding a pre-diluted non-ionic N-1986 (a polyacrylamide having a molecular weight of 12,000,000 from Cytec Industries, Inc., West Paterson, N.J.) flocculant solution made by combining a given amount of N-1986 (a polyacrylamide having a molecular weight of 12,000,000 from Cytec Industries, Inc., West Paterson, N.J.) flocculant solution made by combining a given amount of 0.5% N-1986 solution and 100 g of de-ionized water to give 1000 ppm N-1986 on the AEI/CHA SAPO intergrowth molecular sieve, then 16,000 ppm of cationic flocculant C-591 was added. The system was mixed by shaking for at least 30 times, then allowed to settle. The settling rate measured was 14.0 vol. %/hr.

While the present invention has been described and illustrated by reference to particular embodiments, those of ordinary skill in the art will appreciate that the invention lends itself to variations not necessarily illustrated herein. For example, it is contemplated that one or more molecular sieves are recoverable in the presence of one or more flocculants. For this reason, then, reference should be made solely to the appended claims for purposes of determining the true scope of the present invention.

What is claimed is:

1. A process for producing one or more olefin(s), the process comprising the steps of:
   (a) introducing a feedstock comprising one or more oxygenates to a reactor system in the presence of a formulated molecular sieve catalyst composition produced by (i) forming a recovered molecular sieve into a shaped catalyst and (ii) calcining the shaped catalyst into an activated molecular sieve catalyst; wherein the recovered molecular sieve comprises a first flocculant having a molecular weight from about 500 to about 50,000,000 and a charge density of from about 5% to about 100%;

(b) withdrawing from the reactor system an effluent stream; and (c) passing the effluent stream through a recovery system recovering the one or more olefin(s).

2. The process of claim 1 further comprising the steps of:

passing a hydrocarbon feedstock to a syngas production zone to produce a synthesis gas stream; and contacting the synthesis gas stream with a catalyst to form the feedstock comprising one or more oxygenates.

3. The process of claim 2, wherein the process further comprises the step of:

polymerizing the one or more olefin(s) in the presence of a polymerization catalyst into a polyolefin.

4. The process of claim 1, wherein the process further comprises the step of:

polymerizing the one or more olefin(s) in the presence of a polymerization catalyst into a polyolefin.

5. The process of claim 1, wherein the first flocculant has a charge density greater than 20%.

6. The process of claim 1, wherein the first flocculant is selected from the group consisting of flocculants that are cationic, anionic, nonionic, or mixtures thereof.

7. The process of claim 1, wherein the recovered molecular sieve comprises from 0.005 wt % to less than 10 wt % first flocculant based on the total weight of the recovered molecular sieve.

8. The process of claim 1, wherein the recovered molecular sieve comprises a second flocculant selected from the group consisting of flocculants that are cationic, anionic, nonionic, or mixtures thereof.

9. The process of claim 1, wherein the recovered molecular sieve comprises at least 0.005 wt % first flocculant based on the total weight of the recovered molecular sieve.

10. The process of claim 8, wherein the recovered molecular sieve comprises at least 0.005 wt % second flocculant based on the total weight of the recovered molecular sieve.

11. The process of claim 8, wherein the ratio of the first flocculant to the second flocculant is 100:1 to 1:100.

12. The process of claim 1, wherein the synthesis of the recovered molecular sieve includes combining in a vessel the flocculent with a source of aluminum, a source of phosphorous, a source of silicon, a templating agent, and a metal containing compound a solids-rich phase in the lower portion of the vessel and a solids-free or solids-lean liquid layer in the upper portion of the vessel, wherein the rate of settling of the molecular sieve crystals is from 1.2 vol %/hr to 125 vol %/hr.

13. The process of claim 8, wherein the ratio of first flocculant to second flocculant is 100:1 to 1:100.

14. The process of claim 8, further comprising filtrating the molecular sieve synthesis mixture after the addition of the second flocculant.

* * * * *